(12) United States Patent
Karaki et al.

(10) Patent No.: US 9,733,650 B2
(45) Date of Patent: Aug. 15, 2017

(54) WATER SUPPLY APPARATUS AND WATER SUPPLY METHOD

(71) Applicant: Ebara Corporation, Tokyo (JP)

(72) Inventors: Ryotaro Karaki, Tokyo (JP); Sachiko Miyauchi, Tokyo (JP); Yasutaka Konishi, Tokyo (JP); Kazuhiro Kaneda, Tokyo (JP); Tomoharu Tejima, Tokyo (JP); Nobuhiro Higaki, Tokyo (JP)

(73) Assignee: Ebara Corporation, Tokyo (JP)

( * ) Notice: Subject to any disclaimer, the term of this patent is extended or adjusted under 35 U.S.C. 154(b) by 401 days.

(21) Appl. No.: 14/368,570

(22) PCT Filed: Dec. 25, 2012

(86) PCT No.: PCT/JP2012/083423
§ 371 (c)(1),
(2) Date: Jun. 25, 2014

(87) PCT Pub. No.: WO2013/099843
PCT Pub. Date: Jul. 4, 2013

(65) Prior Publication Data
US 2014/0316591 A1    Oct. 23, 2014

(30) Foreign Application Priority Data

Dec. 27, 2011    (JP) .................................. 2011-286249

(51) Int. Cl.
*G05D 7/06* (2006.01)
*F04B 49/06* (2006.01)

(52) U.S. Cl.
CPC ......... *G05D 7/0676* (2013.01); *F04B 49/065* (2013.01)

(58) Field of Classification Search
None
See application file for complete search history.

(56) References Cited

U.S. PATENT DOCUMENTS 6,424,871 B1 * 7/2002 Nakajima .............. H02K 11/33
                                                    700/11
2007/0150166 A1 * 6/2007 Mino .................... F02D 31/007
                                                    701/110

(Continued)

FOREIGN PATENT DOCUMENTS

JP      59-051193       3/1984
JP      2005-188120 A   7/2005

(Continued)

OTHER PUBLICATIONS

Japanese Patent Office, International Search Report in International Patent Application No. PCT/JP/2012/083423 (Jan. 29, 2013).

(Continued)

*Primary Examiner* — Tuan Dao
(74) *Attorney, Agent, or Firm* — Leydig, Voit & Mayer, Ltd.

(57) ABSTRACT

A water supply apparatus is provided to meet demands for energy saving by controlling the rotational speed of a pump (1), for example, so as to lower the rotational speed in the time zone when water is not used much while avoiding the time zone when water is used in large quantities. The water supply apparatus includes the pump (1) configured to pressurize and deliver water, a frequency converter configured to supply electric power to the pump (1) to operate the pump (1) at a variable speed, and a controller (15) configured to send operating signals to the frequency converter so as to operate the pump (1) either at a first operation or at a second operation with less power consumption than the first operation. The controller (15) is configured to judge whether the operation of the pump (1) should be shifted from the first operation to the second operation based on an operational state of the pump (1).

19 Claims, 22 Drawing Sheets

(56) References Cited

U.S. PATENT DOCUMENTS

| | | | | |
|---|---|---|---|---|
| 2009/0038696 A1* | 2/2009 | Levin | ................... | F04B 49/002 |
| | | | | 137/565.11 |
| 2010/0254827 A1 | 10/2010 | Yang | | |
| 2011/0231022 A1* | 9/2011 | McNamara | ......... | F24D 19/1051 |
| | | | | 700/282 |
| 2012/0090341 A1* | 4/2012 | Hatada | ................... | F25B 27/00 |
| | | | | 62/238.7 |
| 2012/0101647 A1* | 4/2012 | Laflamme | ............ | A61H 33/005 |
| | | | | 700/291 |

FOREIGN PATENT DOCUMENTS

| | | |
|---|---|---|
| JP | 2005-351268 A | 12/2005 |
| JP | 2006-29173 A | 2/2006 |
| JP | 2007-177795 A | 7/2007 |
| JP | 2008-223682 A | 9/2008 |
| WO | WO 2005-088134 A1 | 9/2005 |

OTHER PUBLICATIONS

European Patent Office, Supplementary European Search Report from EP Application No. 12863447.4, dated Feb. 4, 2016, 9 pages.

* cited by examiner

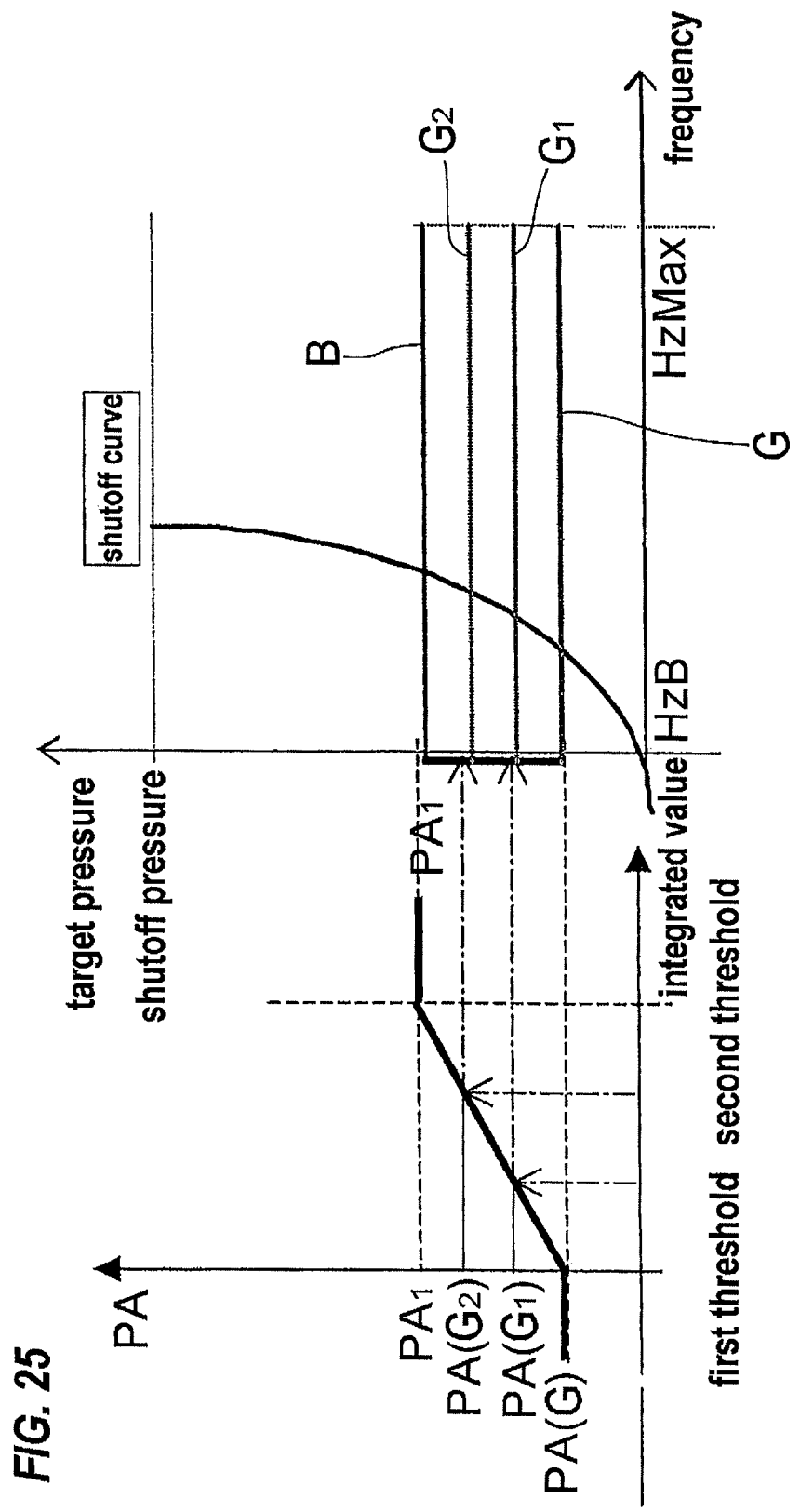

WATER SUPPLY APPARATUS AND WATER SUPPLY METHOD

TECHNICAL FIELD

The present invention relates to a water supply apparatus and water supply method for supplying water such as tap water to collective housing or a building using a pump. Further, the present invention relates to a control device of the water supply apparatus and a control program of the water supply apparatus.

BACKGROUND ART

As an apparatus installed in collective housing or a building for supplying water to each of water supply ends, there has been a water supply apparatus. FIG. 1 shows a typical example of such water supply apparatus. The water supply apparatus includes two pumps 1 combined with respective motors M for pressurizing and delivering water, and inverters (frequency converters) 2 for supplying electric power to the motors M for driving the respective pumps 1. The water supply apparatus includes a pressure tank 3 and a discharge-side pressure sensor 4 at the discharge side of the pumps 1, and flow switches (flow rate detecting means) 6 and check valves 7 for the respective pumps 1. A suction-side pipe 8 of the pumps 1 is connected to a water main 9. A suction-side pressure sensor 10 and a backflow prevention device 11 are provided in the suction-side pipe 8. Further, a bypass pipe 12 for supplying water only by the pressure of the water main 9 is provided between the suction-side pipe 8 and a discharge-side pipe 13 for the pumps 1. A check valve 14 is provided in the middle of the bypass pipe 12. A controller 15 for controlling the pumps 1 controls the rotational speeds of the pumps 1 and the number of operating pumps 1 according to the situation, based on signals from these sensors.

If the water supply apparatus is not a directly connected water supply apparatus whose suction-side pipe of the pump is connected to the water main, but is a receiving tank type water supply apparatus, then the suction-side pipe of the pump is connected to a water receiving tank, and a water level detector provided in the water receiving tank is connected to the controller. The receiving tank type water supply apparatus is free of the backflow prevention device, the suction-side pressure sensor, and the bypass pipe.

FIG. 2 shows a required head curve A representing the relationship between a usage flow rate and a pump head required for the usage flow rate, and a (standard) control head curve B established based on the required head curve A, as well as H-Q curves of the pump (rotational speeds $N_1$, $N_2$, $N_3$ of the pump). In FIG. 2, the horizontal axis represents the flow rate Q, and the vertical axis represents the pump head (head) H.

The required head curve A is determined from the sum ($H_1+H_2+H_3$) of the head $H_1$ of, for example, the building (the height of the highest floor of the building), the pressure $H_2$ required for the water supply instrument (pressure loss caused by the water supply instrument), and the piping loss $H_3$ depending on the flow rate. In the illustrated example, the required head curve A is plotted as a curve smoothly interconnecting a head $PB_0$ required when the usage flow rate is nil and a head $PA_0$ required when the usage flow rate is of a final point $Q_0$.

The required head curve A is determined from the relationship between an ideal pump head and a usage flow rate. For actual designs, it has widely been customary to establish the (standard) control head curve B which is higher than the required head curve A by a margin of, e.g., a dozen %, and to control the rotational speed of the pump based on the control head curve B. The (standard) control head curve B is plotted as a curve smoothly interconnecting a head (lowest required pressure) $PB_1$ which is higher than the head $PB_0$, by a margin of a dozen %, required when the usage flow rate is nil, and a head (highest required pressure) $PA_1$ which is higher than the head $PA_0$, by a margin of a dozen %, required when the usage flow rate is of the final point $Q_0$.

The control head curve B is stored in a memory of the controller 15 of the water supply apparatus shown in FIG. 1 as a function of the head and the rotational speed. Based on the control head curve B, the controller 15 controls the rotational speed of the pump 1 so that when the usage flow rate is $Q_1$, the intersection $U_3$ between the flow rate $Q_1$ and the control head curve B will be at the operating point (rotational speed $N_1$) of the pump 1, as shown in FIG. 2, for example.

FIG. 3 shows an example of an operation cycle of the water supply apparatus shown in FIG. 2. In FIG. 3, the horizontal axis represents time, and the vertical axis represents the rotational frequency of the pump. The rotational frequency of the pump 1 is controlled in a variable speed manner by the inverter 2.

As shown in FIG. 3, when the pump 1 stops its driving (time: $t_1$), and then a discharge pressure DP measured by the discharge-side pressure sensor 4 becomes lower than a set pressure (setting pressure) SP (DP<SP), it is judged that water is used, and the pump 1 starts to rotate (time: $t_2$) and supplies water. During supply of water, a PI calculation is performed by using the set pressure SP and the current discharge pressure DP measured by the discharge-side pressure sensor 4, and variable speed control of the pump 1 is performed by reflecting the PI calculation results in the rotational frequency of the pump 1.

Thereafter, during supply of water by the pump 1, when the discharge pressure DP becomes sufficiently high and the flow switch 6 is closed and thus a reduction of an amount of used water is detected (time: $t_3$), the pump 1 starts a pressurizing operation for accumulating a pressure in the pressure tank 3 and then performs a small flow rate stopping operation that enables to use water in the pressure tank 3 at the subsequent small flow-rate usage, and then the pump 1 stops its driving (time: $t_4$). The time to detect "closing" of the flow switch 6 is one second, for example.

Then, when the discharge pressure DP measured by the discharge-side pressure sensor 4 becomes lower than the set pressure SP (DP<SP), it is judged that water is used, and the pump 1 starts to rotate again (time: $t_5$) and supplies water.

Here, the time ($t_1$–$t_2$) during which the pump 1 stops its driving is referred to as "pump stopping time". The time ($t_2$–$t_3$) from when the pump 1 starts its driving till when "closing" of the flow switch 6 is detected is referred to as "pump immediately-before driving time". The same shall apply hereinafter. The time ($t_1$–$t_4$) from when the pump 1 stops its driving and then the pump 1 starts its driving to supply water till when the pump 1 stops again corresponds to one cycle of the operation of the water supply apparatus. The water supply time, the pump immediately-before driving time, and the pump stopping time vary depending on the frequency of use of water and the rotational frequency of the pump 1 varies depending on the amount of used water of water.

Specifically, in a time zone when water is continuously used, "the pump immediately-before driving time" to drive the pump continuously is prolonged. In a time zone when water is not used much, "the pump stopping time" to stop the driving of the pump is prolonged. Further, if water is used in large quantities, the rotational speed of the pump is increased, and if only a small quantity of water is used, the rotational speed of the pump is lowered.

As described above, the (standard) control head curve B which is higher than the required head curve A by a margin of a dozen % is set, and the rotational speed of the pump is controlled based on the control head curve B. Therefore, for example, in the case where the water pipe is corroded, causing a greater piping loss than the initially designed piping loss, the water supply apparatus is prevented from failing to exercise the required performance in use and is able to meet the demand for an increase in the flow rate that the user may want to achieve for some reason.

There has been proposed a method of inputting a flow rate determined from the pipe resistance and the pump performance curve and automatically controlling the rotational speed of the pump in order to achieve a target flow rate (see Patent document 1). According to the proposed method, when the flow rate is initially measured, if the flow rate is high, then the rotational speed of the pump is automatically lowered. If the flow rate is still high regardless of the reduction in the rotational speed of the pump, then the rotational speed of the pump is further automatically lowered so as to meet the flow rate. In this manner, the rotational speed of the pump is automatically adjusted sequentially until the target flow rate is reached.

CITATION LIST

Patent Literature

Patent document 1: Japanese laid-open patent publication No. 59-51193

SUMMARY OF INVENTION

Technical Problem

However, when the (standard) control head curve which is higher than the usage flow rate–the pump head required from the user, for example, by a margin of a dozen % is set, and the rotational speed of the pump is controlled based on the control head curve, the control is uniquely fixed, and thus no flexible solution has been found to meet energy-saving demands, for example, according to the various circumstances. For example, as shown in FIG. 2, when the rotational speed of the pump is controlled based on the control head curve B to achieve the flow rate $Q_1$ required by the user, the operation of the pump is controlled so that the intersection $U_3$ between the flow rate $Q_1$ and the control head curve B shown in FIG. 2 will be at the operating point (rotational speed $N_1$). Therefore, the operating point cannot be changed as required.

However, if the flow rate $Q_1$ required by the user is ensured, then there are instances where the operation of the pump may be controlled so that the point $U_2$, whose head is higher than the head at the intersection (rotational speed $N_3$) $U_1$ between the flow rate $Q_1$ and the required head curve A and lower than the head at the intersection $U_3$, as shown in FIG. 2, will be at the operating point (rotational speed $N_2$). In such a case, if the pump is driven (operated) at the intersection $U_3$ whose head is higher, the rotational speed of the pump is higher compared to the case where the pump is driven (operated) at the point $U_2$ whose head is lower, and hence the pump consumes more electric power. Such a mode of operation goes against today's stricter needs for energy saving design.

Occasionally, the user may find it unnecessary to control the rotational speed of the pump based on the control head curve which has a sufficient margin. In such a case, demands for energy saving can be met by controlling the rotational speed of the pump based on a control head curve which has a minimum margin required.

Here, for example, in collective housing, a time zone such as morning hours or evening hours when many users frequently use water exists. In such time zone when the amount of used water increases rapidly, if the rotational speed of the pump is lowered to achieve energy saving, there is a possibility that water cannot be supplied at a uniform pressure to each house. Therefore, in order to ensure supply of water at a constant pressure, it is desirable that, for example, the rotational speed of the pump is lowered to achieve energy saving in the time zone when water is not used much while avoiding the time zone when water is used in large quantities.

The invention described in Patent document 1 is not intended to control the operation of the pump so that the rotational speed is lowered in accordance with the flow rate required by the user.

The present invention has been made in view of the above circumstances. It is therefore an object of the present invention to provide a water supply apparatus and a water supply method which control the rotational speed of a pump, for example, so as to lower the rotational speed in the time zone when water is not used much while avoiding the time zone when water is used in large quantities, thereby meeting demands for energy saving.

Solution to Problem

According to one aspect of the present invention, there is provided a water supply apparatus comprising: a pump configured to pressurize and deliver water; a frequency converter configured to supply electric power to the pump to operate the pump at a variable speed; and a controller configured to send operating signals to the frequency converter so as to operate the pump either at a first operation or at a second operation with less power consumption than the first operation. The controller is configured to judge whether the operation of the pump should be shifted from the first operation to the second operation based on an operational state (operating history) of the pump.

In this manner, it is judged whether the operation of the pump should be shifted from the first operation (normal operation) to the second operation (eco operation) with less power consumption than the first operation based on the operational state (operating history) of the pump. Therefore, the operation of the pump is shifted from the first operation (normal operation) to the second operation (eco operation) with less power consumption than the first operation in the time zone when water is not used much while avoiding the time zone when water is used in large quantities or the amount of used water increases rapidly, thereby meeting the demand for energy saving.

According to another aspect of the present invention, there is provided a water supply apparatus comprising: a pump configured to pressurize and deliver water; a frequency converter configured to supply electric power to the pump to operate the pump at a variable speed; and a controller configured to send operating signals to the frequency converter so as to operate the pump either at a first operation or at a second operation with less power consumption than the first operation. The controller is configured to judge whether the operation of the pump should be shifted from the second operation to the first operation based on an operational state (operating history) of the pump.

In this manner, it is judged whether the operation of the pump should be shifted from the second operation (eco operation) with less power consumption than the first operation (normal operation) to the first operation based on the operational state (operating history) of the pump. Therefore, the operation of the pump is shifted from the second operation to the first operation in the time zone when the amount of used water increases rapidly, for example, and thus the shortage of water supply to each house or the like can be prevented.

According to still another aspect of the present invention, there is provided a water supply apparatus comprising: a pump configured to pressurize and deliver water; a frequency converter configured to supply electric power to the pump to operate the pump at a variable speed; and a controller configured to send operating signals to the frequency converter so as to operate the pump either at a first operation or at a second operation with less power consumption than the first operation. The controller is configured to judge whether the operation of the pump should be shifted from the first operation to the second operation and from the second operation to the first operation based on an operational state (operating history) of the pump.

According to one aspect of the present invention, there is provided a water supply method comprising: pressurizing and delivering water by supplying electric power from a frequency converter to a pump to operate the pump at a first operation; judging whether the operation of the pump should be shifted from the first operation to a second operation with less power consumption than the first operation based on an operational state (operating history) of the pump; and shifting the operation of the pump from the first operation to the second operation based on the judgement result.

According to another aspect of the present invention, there is provided a water supply method comprising: pressurizing and delivering water by supplying electric power from a frequency converter to a pump to operate the pump at a second operation with less power consumption than a first operation; judging whether the operation of the pump should be shifted from the second operation to the first operation based on an operational state (operating history) of the pump; and shifting the operation of the pump from the second operation to the first operation based on the judgement result.

According to still another aspect of the present invention, there is provided a water supply method comprising: pressurizing and delivering water by supplying electric power from a frequency converter to a pump to operate the pump at a first operation; judging whether the operation of the pump should be shifted from the first operation to a second operation with less power consumption than the first operation based on an operational state (operating history) of the pump and shifting the operation of the pump from the first operation to the second operation based on the judgement result; and judging whether the operation of the pump should be shifted from the second operation to the first operation based on the operational state (operating history) of the pump and shifting the operation of the pump from the second operation to the first operation based on the judgement result.

According to one aspect of the present invention, there is provided a control program for controlling a water supply apparatus which comprises a pump configured to pressurize and deliver water and a frequency converter configured to supply electric power to the pump to operate the pump at a variable speed. The control program comprising: performing an arithmetic processing in which electric power is supplied from the frequency converter to the pump to operate the pump at a first operation, thereby pressurizing and delivering water; performing an arithmetic processing in which it is judged whether the operation of the pump should be shifted from the first operation to a second operation with less power consumption than the first operation based on an operational state (operating history) of the pump, and the operation of the pump is shifted from the first operation to the second operation based on the judgement result, and then performing an arithmetic processing in which the pump is operated at the second operation to pressurize and deliver water; and performing an arithmetic processing in which it is judged whether the operation of the pump should be shifted from the second operation to the first operation based on the operational state (operating history) of the pump, and the operation of the pump is shifted from the second operation to the first operation based on the judgement result, and then performing an arithmetic processing in which the pump is operated at the first operation to pressurize and deliver water.

According to one aspect of the present invention, there is provided a control device for controlling a water supply apparatus which comprises a pump configured to pressurize and deliver water and a frequency converter configured to supply electric power to the pump to operate the pump at a variable speed. The control device comprising: a setting unit as a human interface; a memory configured to store the control program and to store data inputted from the setting unit; an I/O unit configured to receive signals from sensors installed in the water supply apparatus and to send signals to a processor set forth below, and to send operating signals from the processor to the frequency converter so as to operate the pump either at a first operation or at a second operation with less power consumption than the first operation; and the processor configured to perform the control program based on data stored in the memory and signals sent from the I/O unit.

Advantageous Effects of Invention

According to the water supply apparatus and the water supply method of the present invention, it is possible to operate the pump at a second operation (eco operation) with less power consumption than a first operation (normal operation). Consequently, the amount of electric power consumed for the water supply can be reduced to achieve energy saving, leading to $CO_2$ reduction. Further, since the switching between the first operation and the second operation is automatically judged, the shortage of the pump head caused by switching the operation of the pump from the first operation to the second operation at a time zone when water is used in large quantities can be prevented, and the operation of the pump that is rotated at a rotational speed higher than necessary in the first operation at a time zone when water is not used much can be prevented. Thus, it is possible to perform an energy-saving operation only when the energy-saving operation is available while ensuring supply of water to the user. In particular, in the case where an amount of supplied water varies greatly depending on seasonal variation in a school or the like, or in the case where the number of vacancies increases in an apartment building after a number of years have passed after the construction, by selecting an optimal control head curve or selecting an energy-saving control, the power consumption of the pump can be reduced without causing discomfort to the user.

BRIEF DESCRIPTION OF DRAWINGS

FIG. 25 is a view used for explaining another example in which the energy-saving control head curve is updated to a new energy-saving control head curve which is proportional to the integrated value of the integrated coefficient.

DESCRIPTION OF EMBODIMENTS

Figure 1:
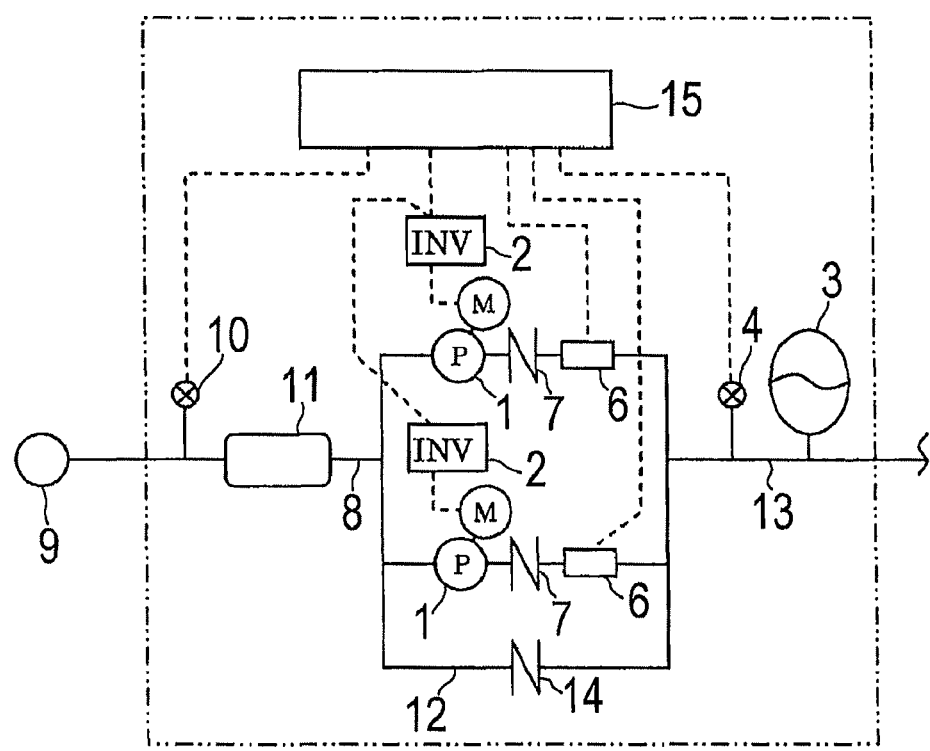
FIG. 1 is a view showing a structural example of a conventional water supply apparatus.
Figure 2:
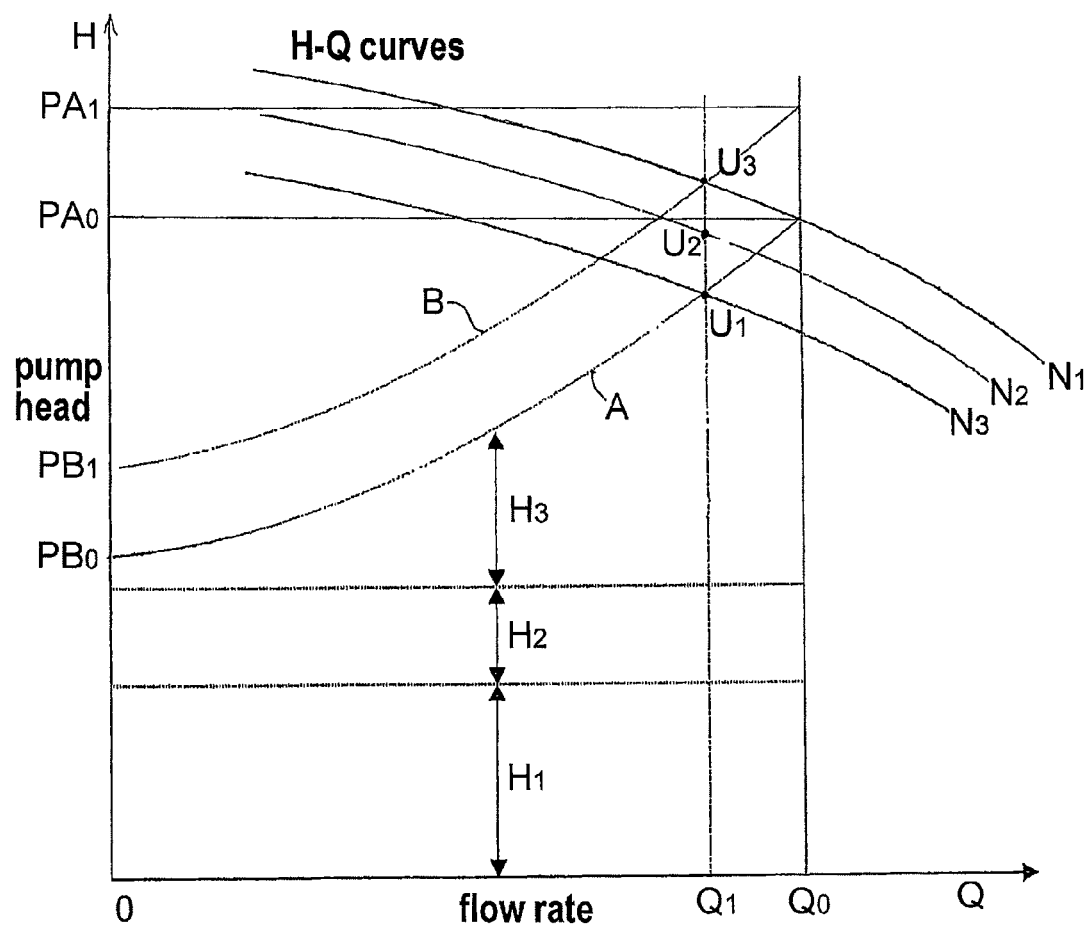
FIG. 2 is a graph showing a required head curve of a water supply apparatus, a (standard) control head curve of a conventional water supply apparatus, and H-Q curves of a pump.

Embodiments of the present invention will be described in detail below with reference to the drawings. In FIGS. 1 through 25, identical or corresponding parts are denoted by identical reference numerals, and will not be described in duplication.

Figure 4:
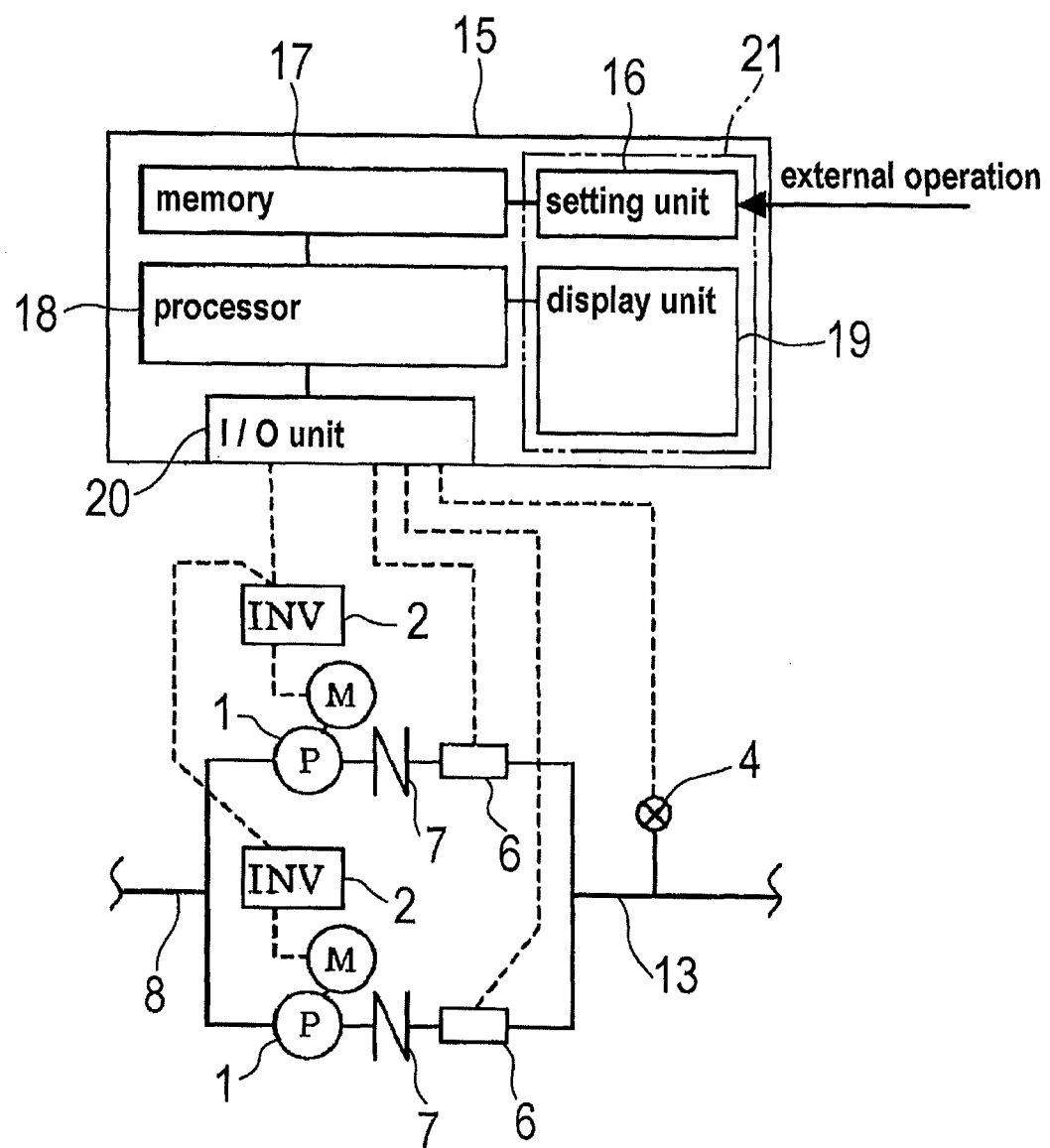
FIG. 4 is a view showing a structural example of a water supply apparatus according to an embodiment of the present invention.

FIG. 4 is a view showing a structural example of a water supply apparatus according to an embodiment of the present invention. As shown in FIG. 4, the water supply apparatus includes a controller (control device) 15 having a setting unit 16, a memory 17, a processor 18, a display unit 19, and an I/O unit 20. The setting unit 16 and the display unit 19 are incorporated in an operation panel 21 of the water supply apparatus. Details of the parts other than the controller 15 are essentially the same as those of the conventional water supply apparatus shown in FIG. 1.

The operation panel 21 has the setting unit 16 and the display unit 19; and has switches, input confirmation buzzers, and input confirmation displays, for example. The operation panel 21 functions as a human interface. Various settings for creating a plurality of control head curves, etc., which represent the different relationships between flow rates and heads, for example, the above-mentioned head (lowest required pressure) $PB_1$ required when the usage flow rate is nil, and the above-mentioned head (highest required pressure) $PA_1$ required when the usage flow rate is of the final point $Q_0$, are inputted into the setting unit 16, by external operation. Further, as various settings for judging whether or not the control head curves should be switched, for example, a predetermined time ("a" and "b") about a pump driving time and a pump stopping time described below, various settings for creating relational expressions between an integrated coefficient and an operating frequency described below, and various settings for calculating the "n-th" threshold described below are inputted into the setting unit 16. The setting unit 16 has a function for setting ON/OFF for selecting whether the following eco mode is on or off. Data inputted in the setting unit 16 are stored in the memory 17.

The display unit 19 functions as the human interface, and displays various data such as settings stored in the memory 17 and a current operational state (operating condition) of the pump such as operation or stop of the pump, an operating frequency, a current, a discharge pressure, an inflow pressure (in the case of a direct connection water supply), and a water level of a water receiving tank.

A memory such as a RAM is used as the memory 17, and a control program shown by a control flowchart described below or the like, and various data such as data (driving time, stopping time, and integrated value) of calculation results in the processor 18, pressure values (flow pressure, and discharge pressure), data inputted by the setting unit 16, and data or the like inputted by the I/O unit 20 or outputted by the I/O unit 20 are stored in the memory 17.

Ports or the like are used as the I/O unit 20, and the I/O unit 20 receives signals from various sensors installed in the water supply apparatus, such as an output signal from the discharge-side pressure sensor 4 and a signal from the flow switch 6, and sends the received signals to the processor 18. The I/O unit 20 also performs input and output of signals in communications.

A CPU is used as the processor 18, and the processor 18 performs measurement of the time (the immediately-before driving time and the stopping time), calculation of integration (integrated values), processing of communication data, calculation of a target pressure, calculation of frequency command values, and the like on the basis of the program and various data stored in the memory 17 and signals inputted from the I/O unit 20. Then, the output from the processor 18 is inputted into the I/O unit 20.

Further, the I/O unit 20 and the inverters 2 are connected to each other by communication means such as RS485. The I/O unit 20 sends various settings, frequency command values, and control signals including start and stop signals to the inverters 2, and the inverters 2 sequentially send operational details (operating condition) including actual frequency values and current values to the I/O unit 20.

For the transmission and reception of the control signals between the I/O unit 20 and each of the inverters 2, analog signals can be used for frequencies and the like, and digital signals can be used for operation and stop commands and the like.

Figure 5:
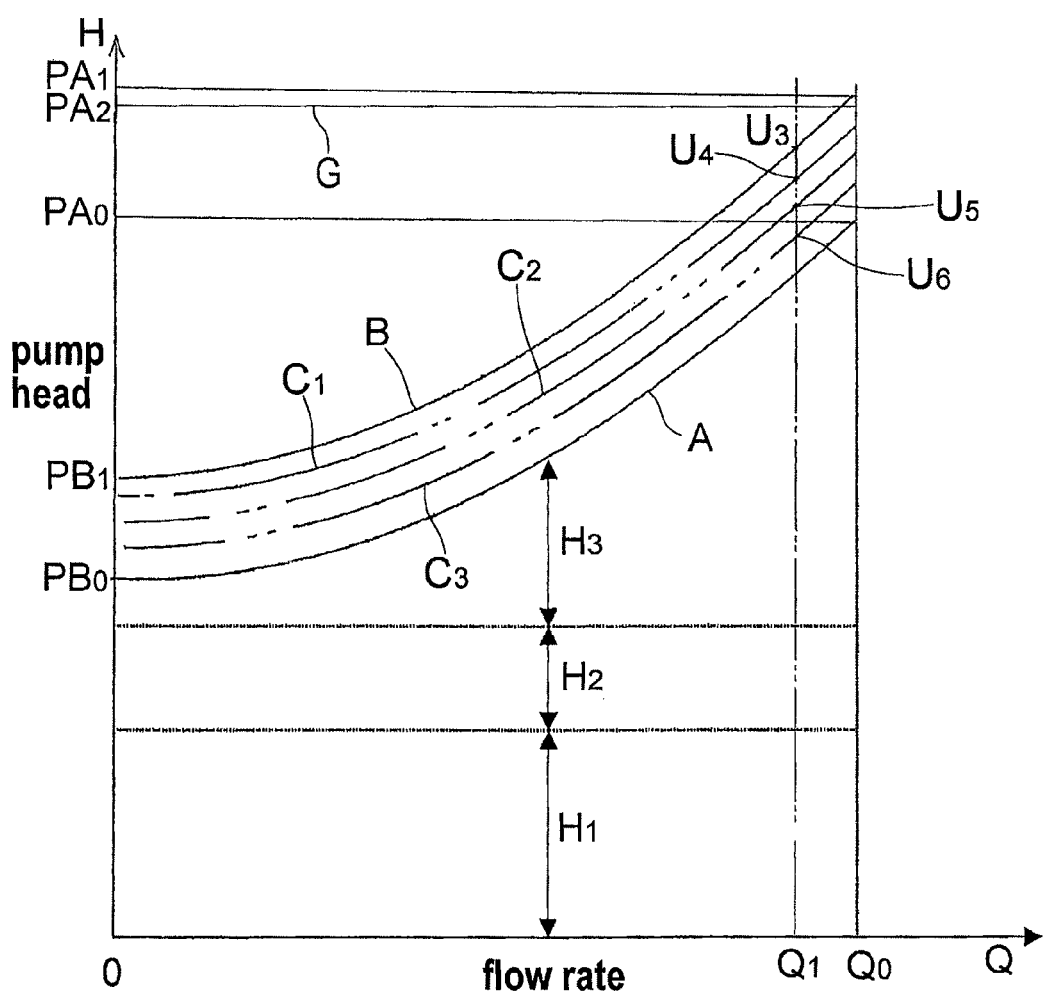
FIG. 5 is a graph showing a plurality of control head curves as well as a required head curve which are stored in a controller of the water supply apparatus according to the embodiment of the present invention.

FIG. 5 shows a plurality of control head curves established by the setting unit 16 and stored in the memory 17. FIG. 5 shows energy-saving control head curves that have heads lower than that of the control head curve (hereinafter, referred to as a standard control head curve) for the first operation (normal operation) in a full flow rate range or a part of flow rate range, as control head curves for a second operation with less power consumption than the first operation. The illustrated example uses a required head curve A that is determined from the sum ($H_1+H_2+H_3$) of, for example, the head $H_1$ of the building (the height of the highest floor of the building), the pressure $H_2$ required for the water supply instrument (the pressure loss caused by the water supply instrument), and the piping loss $H_3$ depending on the flow rate, and a total of four control head curves including the standard control head curve B for the first operation (normal operation) which is higher than the required head curve A by a margin of, e.g., a dozen %, and three energy-saving control head curves $C_1$, $C_2$, $C_3$ for the second operation with less power consumption than the first operation.

Here, the first operation and the second operation will be described below as operations that include a state where the pump is driven to deliver water in each operation.

The energy-saving control head curves $C_1$, $C_2$, $C_3$ extend substantially parallel to the standard control head curve B and have heads lower than that of the standard control head curve B over the full flow rate range. The heads of the energy-saving control head curves $C_1$, $C_2$, $C_3$ are successively lower in the order named. Then, one of the four control head curves B, $C_1$, $C_2$, $C_3$ is selected, and the rotational speed of the pump 1 is controlled based on the selected one of the four control head curves B, $C_1$, $C_2$, $C_3$.

Figure 6:
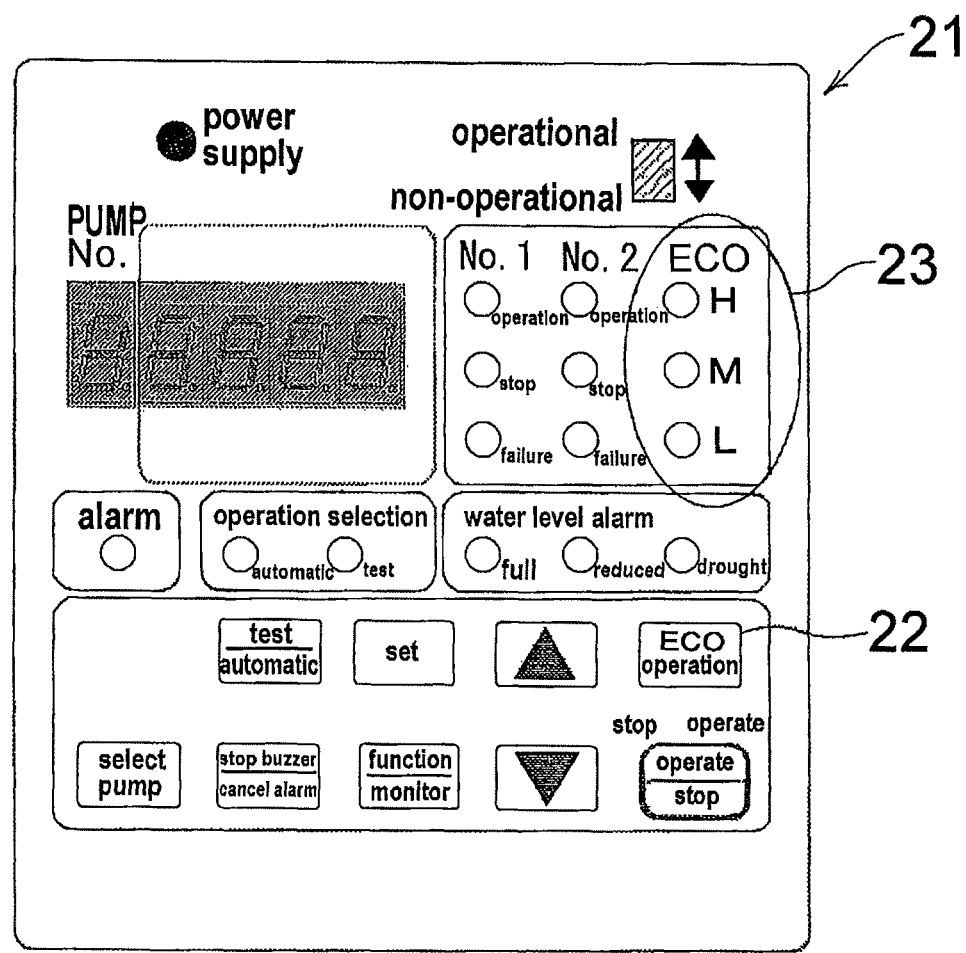
FIG. 6 is a plan view of an operation panel provided in the water supply apparatus according to the embodiment of the present invention.

FIG. 6 is a plan view of the operation panel 21 of the water supply apparatus. As shown in FIG. 6, the operation panel 21 includes a selector button 22 for successively selecting the four control head curves B, $C_1$, $C_2$, $C_3$ that are stored in the memory 17, and an energy-saving indicator 23 for indicating energy-saving levels corresponding to the control head curves that are used to control the rotational speed of the pump 1.

Here, an operational state (operating mode) where any lamps of the energy-saving indicator 23 are not turned on is referred to as a standard mode, and a state where the lamps (any one of the lamps) of the energy-saving indicator 23 are turned on is referred to as the eco mode.

When the selector button 22 is not pressed, any lamps of the energy-saving indicator 23 are not turned on, and the standard control head curve B is used to control the rotational speed of the pump 1. When the selector button 22 is pressed once, a lamp corresponding to "L" on the energy-saving indicator 23 is turned on, and the standard control head curve B is automatically switched to the energy-saving control head curve $C_1$, and the energy-saving control head curve $C_1$ is used to control the rotational speed of the pump 1. When the selector button 22 is pressed twice, a lamp corresponding to "M" on the energy-saving indicator 23 is turned on, and the standard control head curve B is automatically switched to the energy-saving control head curve $C_2$, and then the energy-saving control head curve $C_2$ is used to control the rotational speed of the pump 1. Further, when the selector button 22 is pressed three times, a lamp corresponding to "H" on the energy-saving indicator 23 is turned on, and the standard control head curve B is automatically switched to the energy-saving control head curve $C_3$, and then the energy-saving control head curve $C_3$ is used to control the rotational speed of the pump 1. When the selector button 22 is pressed four times, the energy-saving indicator 23 goes back to the original standard mode from the eco mode.

Specifically, in the standard mode, the standard control head curve (B) is used to control the rotational speed of the pump 1, and in the eco mode, the control head curve used for controlling the rotational speed of the pump 1 is automatically switched from the standard control head curve (B) to the energy-saving control head curve ($C_1$, $C_2$ or $C_3$) based on the operational state (operating history) of the pump 1, and the rotational speed of the pump 1 is controlled.

As described above, the user can easily switch manually the operational state (operating mode) of the pump 1 between the standard mode and the eco mode by using the selector button 22, and if the eco mode is on, it is possible to check which stage in the three stages is selected by the energy-saving indicator 23.

The operation of the water supply apparatus for controlling the rotational speed of the pump to achieve the flow rate $Q_1$ required by the user will be described below with reference to FIG. 5. First, when the user does not press the selector button 22, the rotational speed of the pump 1 is controlled based on the standard control head curve B, so that the intersection $U_3$ between the standard control head curve B and the flow rate $Q_1$ will be at the operating point of the pump 1. At this time, any lamps of the energy-saving indicator 23 are not turned on.

Next, the case where water is supplied at the flow rate $Q_1$ will be described by way of example.

When the user presses the selector button 22 once, the eco mode is on, and a lamp corresponding to "L" on the energy-saving indictor 23 is turned on and the standard control head curve B is automatically switched to the energy-saving control head curve $C_1$ depending on the operational state (operating history) of the pump. Thus, the rotational speed of the pump 1 is controlled based on the energy-saving control head curve $C_1$. In this case, the intersection $U_4$ between the energy-saving control head curve $C_1$ and the flow rate $Q_1$ becomes the operating point of the pump 1. When the selector button 22 is pressed twice, a lamp corresponding to "M" on the energy-saving indicator 23 is turned on, and the standard control head curve B is automatically switched to the energy-saving control head curve $C_2$ depending on the operational state (operating history) of the pump, and the rotational speed of the pump 1 is controlled based on the energy-saving control head curve $C_2$. In this case, the intersection $U_5$ between the energy-saving control head curve $C_2$ and the flow rate $Q_1$ becomes the operating point of the pump 1. When the selector button 22 is pressed three times, a lamp corresponding to "H" on the energy-saving indicator 23 is turned on, and the standard control head curve B is automatically switched to the energy-saving control head curve $C_3$ depending on the operational state (operating history) of the pump, and the rotational speed of the pump 1 is controlled based on the energy-saving control head curve $C_3$. In this case, the intersection $U_6$ between the energy-saving control head curve $C_3$ and the flow rate $Q_1$ becomes the operating point of the pump 1.

In this manner, even if the amount of used water remains the same, the pump can be operated at a selected operating point having a lower rotational speed, as required. Consequently, the amount of electric power consumed for the water supply can be reduced to achieve energy saving, leading to $CO_2$ reduction.

Figure 7:
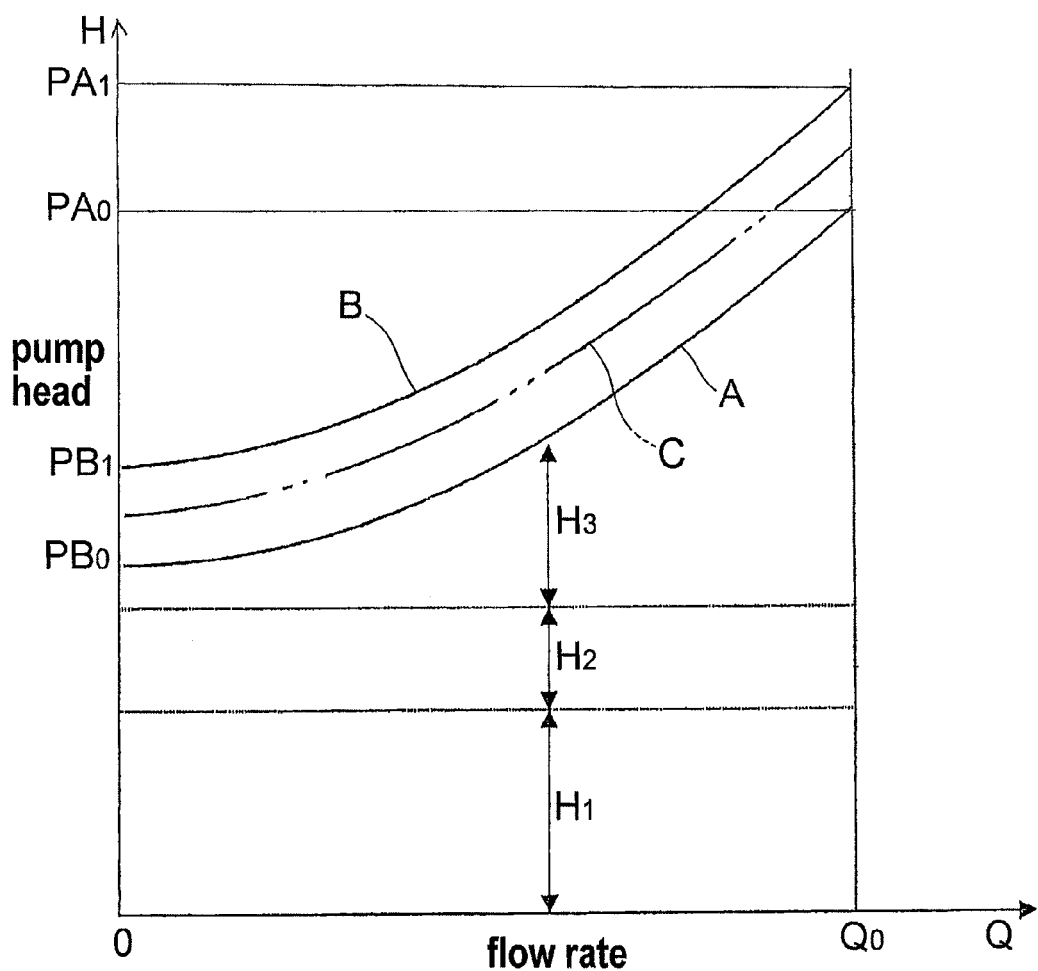
FIG. 7 is a graph showing an energy-saving control head curve for use as a control head curve according to the present invention, as well as a required head curve and a standard control head curve.

In the above example, as shown in FIG. 7, a plurality of (in the above example, three of $C_1$, $C_2$ and $C_3$) energy-saving control head curves C that extend substantially parallel to the standard control head curve B and have heads lower than that of the standard control head curve B over the full flow rate range are used to achieve energy saving over the full flow rate range.

Figure 8:
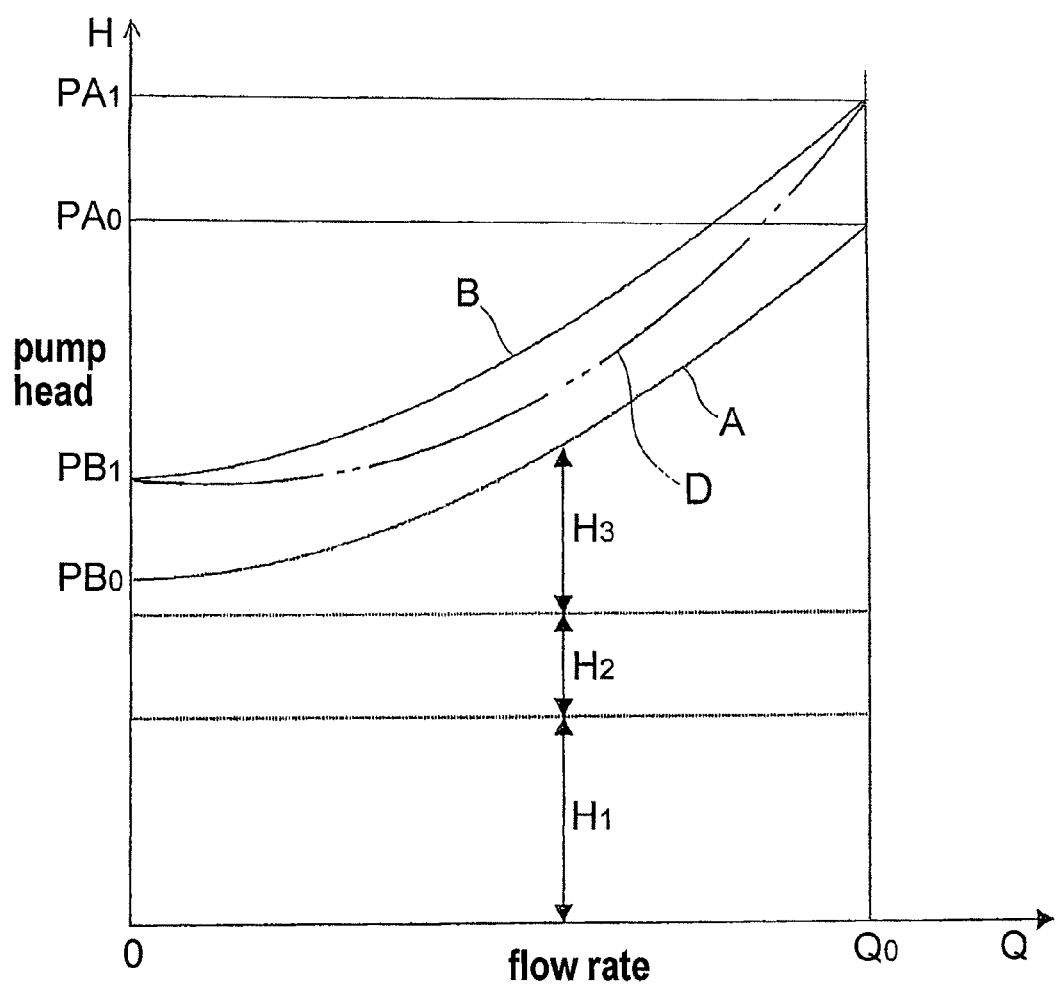
FIG. 8 is a graph showing another energy-saving control head curve for use as a control head curve according to the present invention, as well as a required head curve and a standard control head curve.
Figure 9:
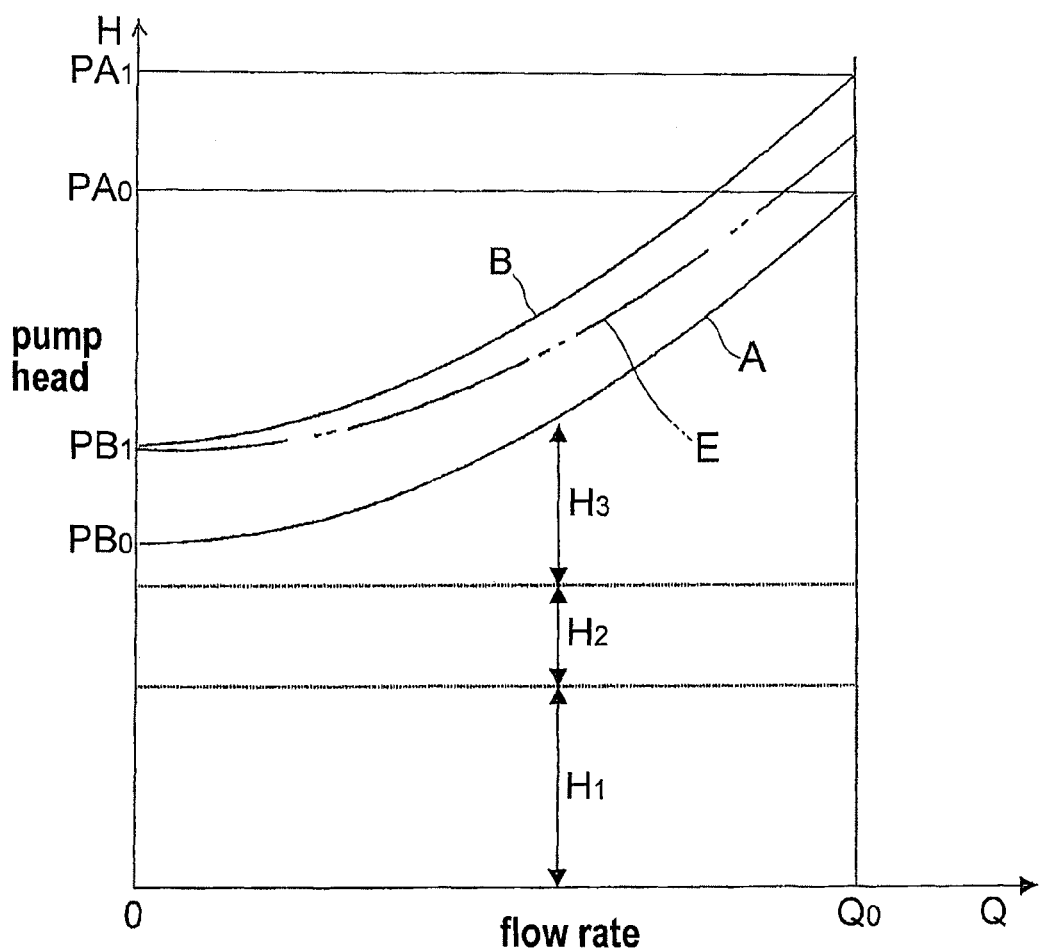
FIG. 9 is a graph showing still another energy-saving control head curve for use as a control head curve according to the present invention, as well as a required head curve and a standard control head curve.
Figure 10:
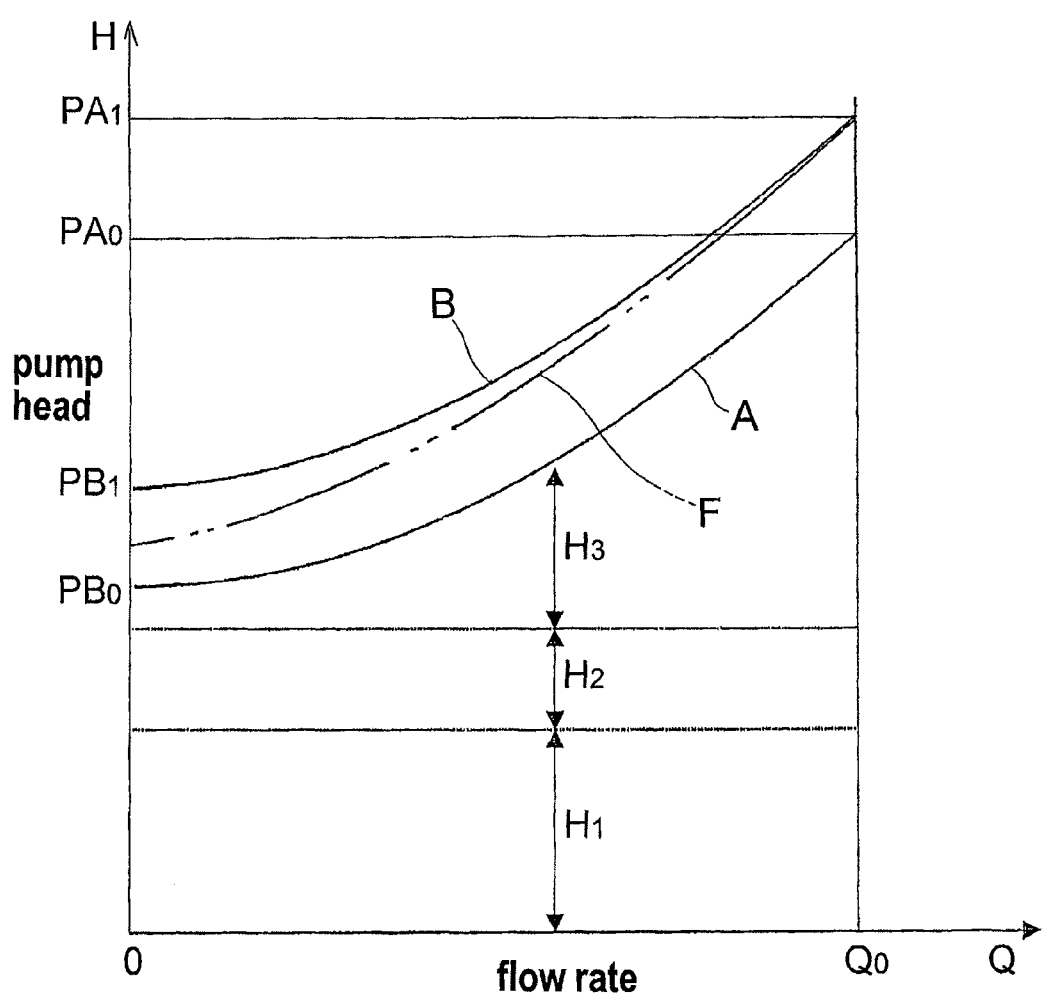
FIG. 10 is a graph showing yet another energy-saving control head curve for use as a control head curve according to the present invention, as well as a required head curve and a standard control head curve.

As shown in FIG. 8, an energy-saving control head curve D that has a head lower than that of the standard control head curve B in a medium flow rate range may be used to achieve energy saving primarily in the medium flow rate range. Further, as shown in FIG. 9, an energy-saving control head curve E that has a head lower than that of the standard control head curve B in a large flow rate range may be used to achieve energy saving primarily in the large flow rate range. Furthermore, as shown in FIG. 10, an energy-saving control head curve F that has a head lower than that of the standard control head curve B in a small flow rate range may be used to achieve energy saving primarily in the small flow rate range.

Here, the control head curves have the energy-saving control head curve $C_1$ for the second operation (eco operation) with less power consumption than the first operation besides the standard control head curve B for the first operation (normal operation) shown in FIG. 5, for example. When the user tries to perform the second operation (eco operation) of the eco mode which uses the energy-saving control head curve $C_1$ by pressing the selector button 22 shown in FIG. 6 once, if the operation of the pump is shifted from the first operation (normal operation) to the second operation (eco operation) immediately after the selector button 22 is pressed once, there is a possibility that water cannot be supplied at a uniform pressure to each house in the time zone when water is used in large quantities. Further, when the pump is kept running at the second operation (eco operation), there is a possibility that supply of water is scarce in the time zone when the amount of used water increases rapidly.

Figure 11:
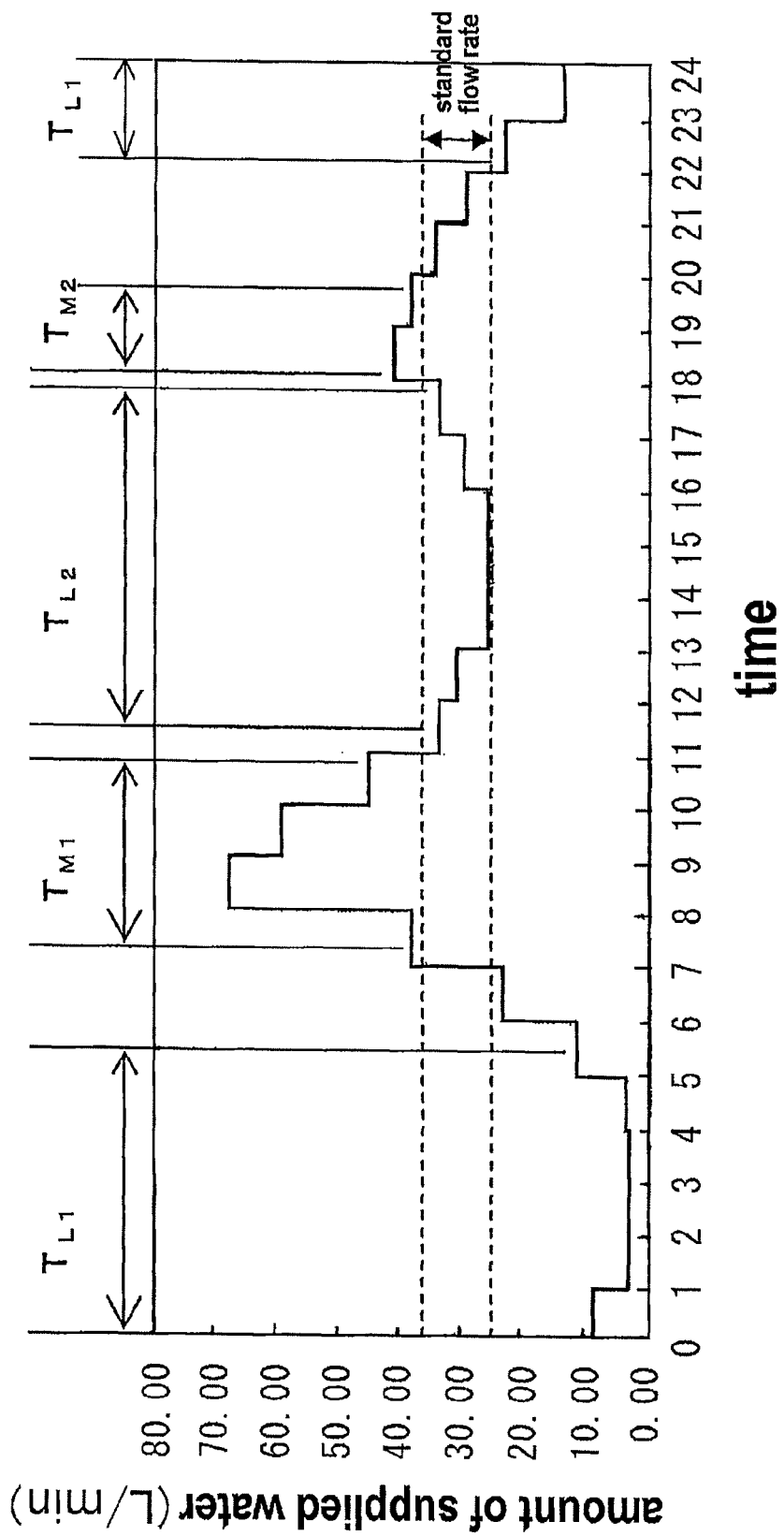
FIG. 11 is a graph showing the relationship between an amount of supplied water (flow rate) and time when the water supply apparatus operates throughout the day.

FIG. 11 is a graph showing the relationship between an amount of supplied water (flow rate) and time when the water supply apparatus operates throughout the day. It can be seen from FIG. 11 that the time zone when water is used in large quantities is from around 7 to 11 o'clock in the morning (time: $T_{M1}$) and from around 18 to 20 o'clock in the evening (time: $T_{M2}$), and the largest amount of supplied water becomes 70 L/min from around 8 to 9 o'clock in the morning, and that the time zone when the amount of used water increases rapidly is from 6 to 8 o'clock in the morning, for example. On the other hand, the amount of supplied water becomes a minimum amount of water from 1 o'clock at midnight to around 5 o'clock in the morning (time: $T_{L1}$).

Therefore, in this example, attention is focused on the relationship between the frequency of use of the water supply apparatus, the pump immediately-before driving time, and the pump stopping time as the operational state (operating history) of the pump, and thus the following operation is performed: When the selector button 22 is pressed and the eco mode is set (eco mode ON), and when the frequency of use of the water supply apparatus is low, the operation of the pump is shifted from the first operation (normal operation) to the second operation (eco operation). Further, when the frequency of use of the water supply apparatus increases during the second operation (eco operation), the operation of the pump is automatically shifted from the second operation (eco operation) to the first operation (normal operation).

When the frequency of use of the water supply apparatus is low, the operation of the pump may be shifted from the first operation (normal operation) to the second operation (eco operation) based on a pump driving rate represented by the following formula 1 and a pump stopping rate represented by the following formula 2, for example, that have a relationship with the frequency of use of the water supply apparatus instead of the pump immediately-before driving time and the pump stopping time. Further, when the frequency of use of the water supply apparatus increases during the second operation (eco operation), the operation of the pump may be automatically shifted from the second operation (eco operation) to the first operation (normal operation). In this manner, as with the above, it is possible to perform an energy-saving operation only when the energy-saving operation is available while ensuring supply of water to the user.

$$\text{The pump driving rate} = \text{the pump driving time}/(\text{the pump driving time} + \text{the pump stopping time}) \quad \text{(formula 1)}$$

$$\text{The pump stopping rate} = \text{the pump stopping time}/(\text{the pump driving time} + \text{the pump stopping time}) \quad \text{(formula 2)}$$

The pump driving rate and the pump stopping rate may be defined as the pump driving time and the pump stopping time per arbitrary time or may be updated at any timing (every arbitrary time). For example, the pump driving rate and the pump stopping rate may be constantly updated by calculating the pump driving time and the pump stopping time per the latest 15 minutes. Specifically, average values are used for calculating the pump driving rate and the pump stopping rate, and it is possible to automatically switch the operation of the pump based on the pump driving rate and the pump stopping rate which are updated by reflecting the latest operational state (operating history). In particular, in the case where the operation and the stopping of the pump are repeated during a relatively short time, the operation of the pump is automatically switched between the first operation (normal operation) and the second operation (eco operation) based on the pump driving rate and the pump stopping rate, instead of the pump immediately-before driving time and the pump stopping time. Therefore, the switching of the operation of the pump is not performed more frequently than necessary, and thus it is possible to supply water with reduced power consumption, without causing discomfort to the user. Also, if the pump driving time or the pump stopping time becomes long, when a frequency of the operation of the pump abruptly changes or a flow rate of water fluctuates rapidly, a changing of the pump driving rate and the pump stopping rate is delayed, and thus there is a possibility of causing a delay of the pressure control. Therefore, the pump driving rate and the pump stopping rate are not defined in time longer than necessary, but it is preferable to calculate the pump driving rate and the pump stopping rate per time from 10 minutes to 20 minutes, for example.

The pump driving time required to calculate the pump driving rate and the pump stop rate may be not only the pump immediately-before driving time $(t_2-t_3)$ at the time $t_3$ in the current cycle or the pump immediately-before driving time $(t_2-t_b)$ at the time $t_b$ in the current cycle as will be described below but also a total of the time when the pump has been driven in respective cycles from as far back as several cycles in the past. Further, the pump stopping time may be not only the stopping time $(t_1-t_2$ or $t_1-t_a$ described below) in the current cycle but also a total of the stopping time of the pump in respective cycles from as far back as several cycles in the past. In the case where the pump driving rate and the pump stopping rate are calculated, the time including also the time $(t_3-t_4)$ when the pump performs a pressurizing operation may be defined as the pump driving time $(t_2-t_4)$.

Figure 12:
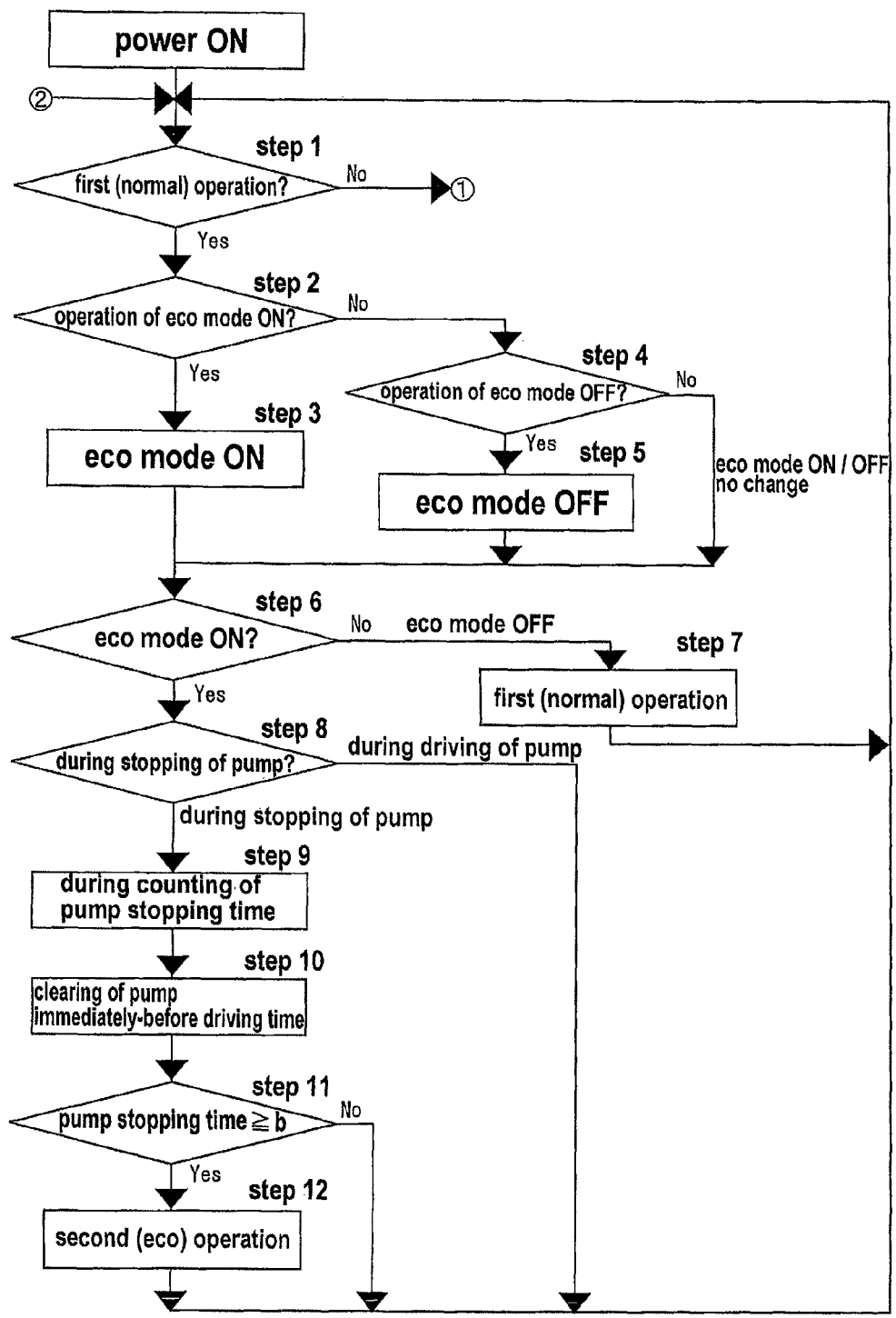
FIG. 12 is a flow chart when the operation of the pump of the water supply apparatus having an operation button for setting an eco mode is shifted from a first operation (normal operation) of a standard mode to a second operation (eco operation) of the eco mode.

FIG. 12 shows a flow chart of control when the operation of the pump is shifted from the first operation (normal operation) of the standard mode in which the standard control head curve B shown in FIG. 5 is used, to the second operation (eco operation) of the eco mode in which the energy-saving control head curve $C_1$ is used, based on the operational state (operating history) of the pump by pressing the selector button 22 shown in FIG. 6, for example. FIG. 12 discloses only the elements required for judging the switching of the operation of the pump. The same shall apply in the following flow charts. Further, in the following flow charts, identical steps are denoted by identical step numbers, and will not be described in duplication.

First, it is judged whether the pump is operated at the first operation (normal operation) (step 1), and when the pump is operated at the first operation (normal operation), it is judged whether an operation of the eco mode ON is performed by the selector button (step 2). If the operation of the eco mode ON is performed by the selector button, the eco mode is turned ON (step 3). If the operation of the eco mode ON is not performed by the selector button, it is judged whether the operation of the eco mode OFF is performed by the selector button (step 4). If the operation of the eco mode OFF is performed by the selector button, the eco mode is turned OFF (step 5).

Next, it is judged whether the eco mode is ON (step 6), and if the eco mode is OFF, the operation of the pump is returned to the step 1 while keeping the operation of the pump (step 7) at the first operation (normal operation). If the eco mode is ON, it is judged whether the pump is stopping (state where the pump is not driven) (step 8).

Figure 3:
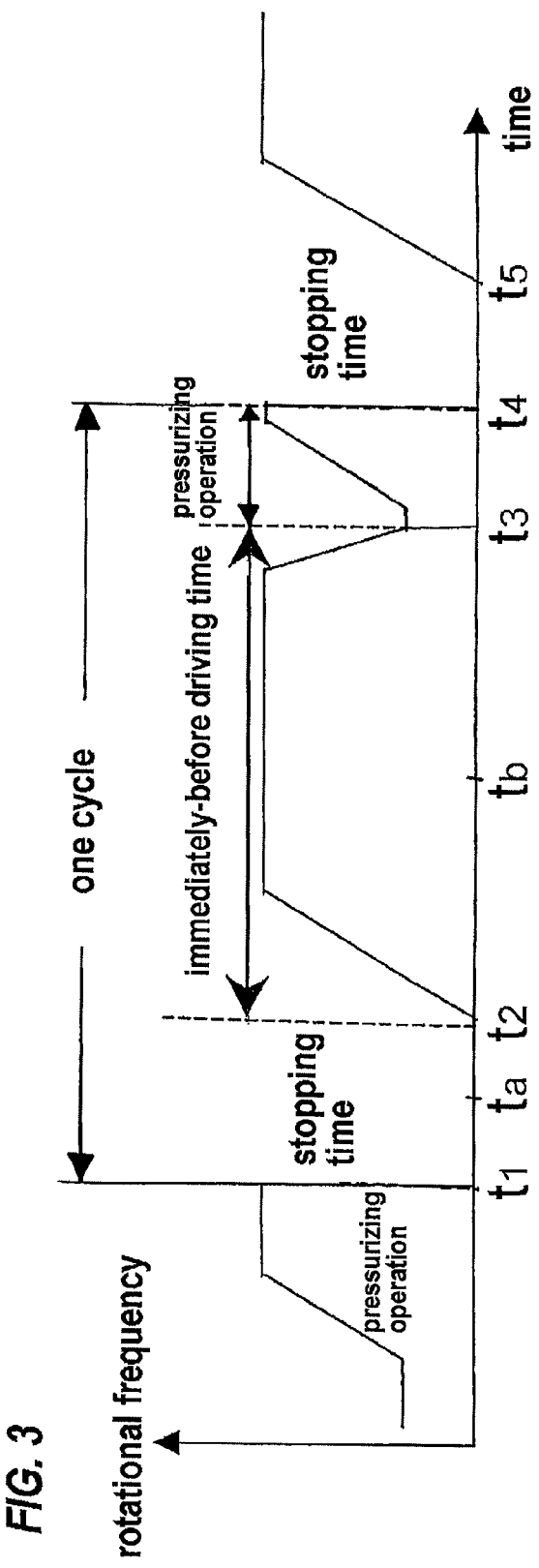
FIG. 3 is a graph showing the relationship between a rotational frequency of the pump and time in the water supply apparatus during its operation.

If the pump is stopping, the pump stopping time is counted (step 9), and the pump immediately-before driving time is cleared (step 10). Then, the pump stopping time is measured (step 11), and if the pump stopping time (for example, the pump stopping time at the time $t_a$ shown in FIG. 3 is a time $(t_1-t_a)$) is a predetermined time "b" (for example 2 minutes) or more (the pump stopping time $(t_1-t_a) \geq b$), it is judged to be the time zone when water is not used much, and the operation of the pump is shifted from the first operation (normal operation) to the second operation (eco operation) (step 12), and the operation of the pump is returned to the step 1.

On the other hand, if the pump is not stopping (the pump is driven), the operation of the pump is returned to the step 1 while keeping the operation of the pump at the first operation (normal operation).

In this manner, the operation of the pump is shifted from the first operation (normal operation) to the second operation (eco operation) in the time zone when water is not used much, and thus it is possible to reduce the consumed electric power by operating the pump at a low rotational speed which allows a reduced margin against a required flow rate of water. Here, in the example shown in FIG. 11, the time zone when water is not used much is from 22 o'clock at night to around 6 o'clock in the morning (time: $T_{L1}$) and from 12 o'clock to around 16 o'clock in the afternoon (time: $T_{L2}$).

Figure 13:
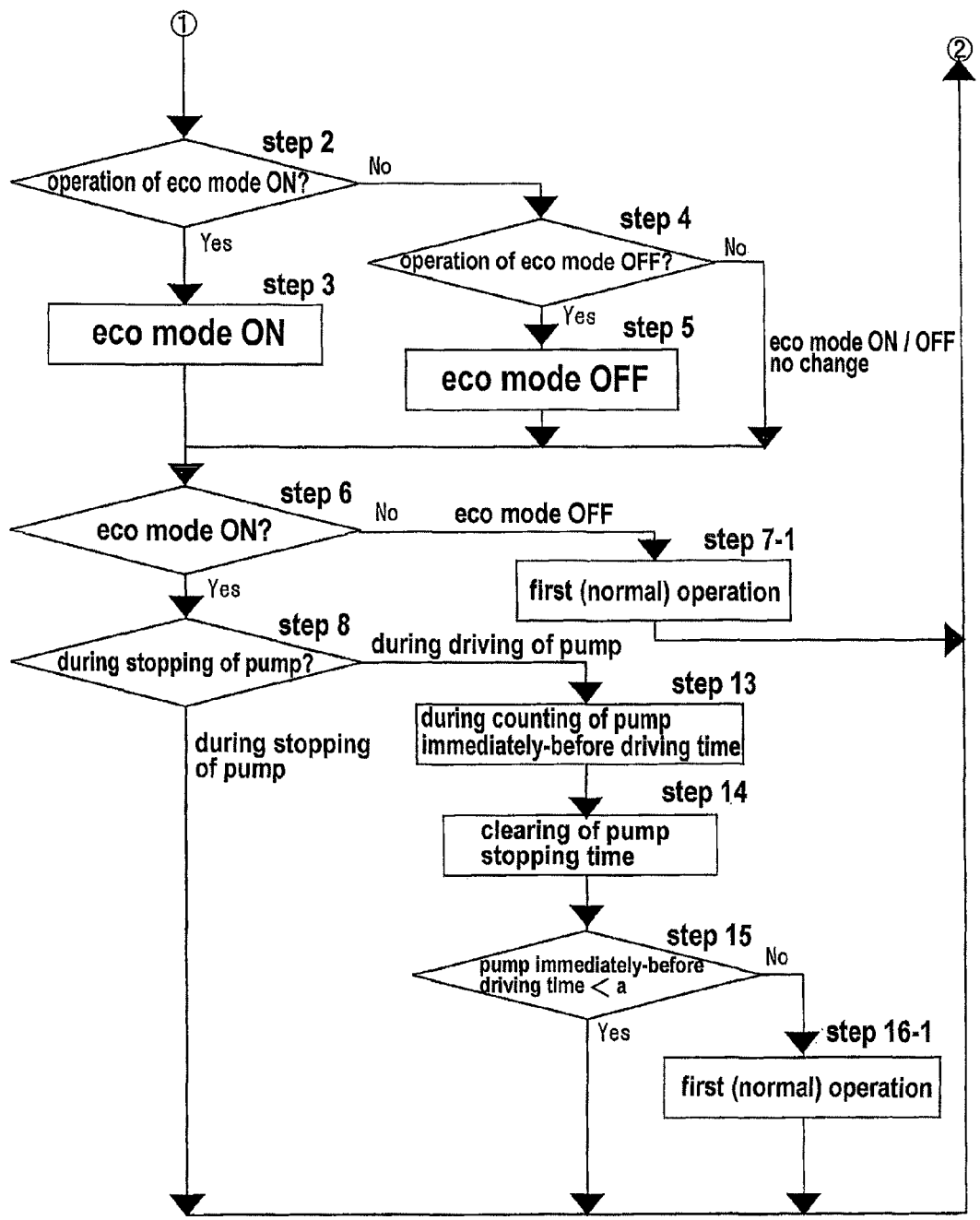
FIG. 13 is a flow chart when the operation of the pump of the water supply apparatus having the operation button for setting the eco mode is shifted from the second operation (eco operation) of the eco mode to the first operation (normal operation) of the standard mode.

FIG. 13 shows a flow chart when the operation of the pump is shifted from the second operation (eco operation) to the first operation (normal operation) in which the standard control head curve B is used in the case where it is judged that the pump is in the second operation (eco operation) (the pump is not in the first operation (normal operation)) in which the energy-saving control head curve $C_1$ shown in FIG. 5 is used in the step 1 in FIG. 12.

In this case, it is judged whether the eco mode is ON (step 6), and when the eco mode is OFF, the operation of the pump is shifted from the second operation (eco operation) to the first operation (normal operation) (step 7-1), and the operation of the pump is returned to the step 1. In the case where the eco mode is ON, it is judged whether the pump is stopping (step 8).

Thereafter, in the case where the pump is stopping, the operation of the pump is returned to the step 1 while keeping the operation of the pump at the second operation (eco operation).

On the other hand, in the case where the pump is not stopping, the pump immediately-before driving time is counted (step 13), and the pump stopping time is cleared (step 14). Then, the pump immediately-before driving time is measured (step 15), and if the pump immediately-before driving time (for example, the pump immediately-before driving time at the time $t_b$ shown in FIG. 3 is a time $(t_2-t_b)$) is less than a predetermined time "a" (for example 2 minutes) (the pump immediately-before driving time $(t_2-t_b)<a$), it is judged to be the time zone when water is not used much. Thus, the operation of the pump is returned to the step 1 while keeping the operation of the pump at the second operation (eco operation). In the case where the pump immediately-before driving time is a predetermined time "a" (for example 2 minutes) or more (the pump immediately-before driving time $(t_2-t_b)\geq a$), it is judged to be the time zone when water is used frequently, and even in the state where the selector button is pressed and the eco mode is ON, the operation of the pump is shifted from the second operation (eco operation) to the first operation (normal operation) (step 16-1), and then the operation of the pump is returned to the step 1.

In this manner, even in the state where the selector button is pressed and the eco mode is ON in the time zone when water is used frequently, the operation of the pump is forcibly returned from the second operation (eco operation) to the first operation (normal operation), and thus supply of water to the user can be ensured.

The predetermined time "a" and "b" can be arbitrarily set. In this example, the driving time and the stopping time of the pump are monitored at all times and are reflected in the operation of the pump. Further, in the case where the selector button is pressed again and the eco mode is turned OFF, the operation of the pump is forcibly returned to the first operation (normal operation). Thus, if a water supply pressure is liable to be insufficient, the operation of the pump can be immediately returned to the first operation (normal operation).

In order to avoid rapid pressure fluctuations, it is preferred to switch the operation of the pump stepwise over a predetermined time without rapidly switching the operation of the pump in the case where the operation of ON/OFF of the eco mode is performed by the selector button or the control head curves are automatically switched.

In the above example, the operation of the pump is shifted from the first operation (normal operation) to the second operation (eco operation) by operating the selector button. However, the eco mode may be set without operating the selector button. For example, the eco mode may be set in the setting unit 16 (see FIG. 4) at the time of shipment from a factory. By setting the eco mode in advance, the water supply apparatus can be controlled so that the operation of the pump is automatically switched between the first operation (normal operation) and the second operation (eco operation) depending on the operational state (operating history) of the pump.

Figure 14:
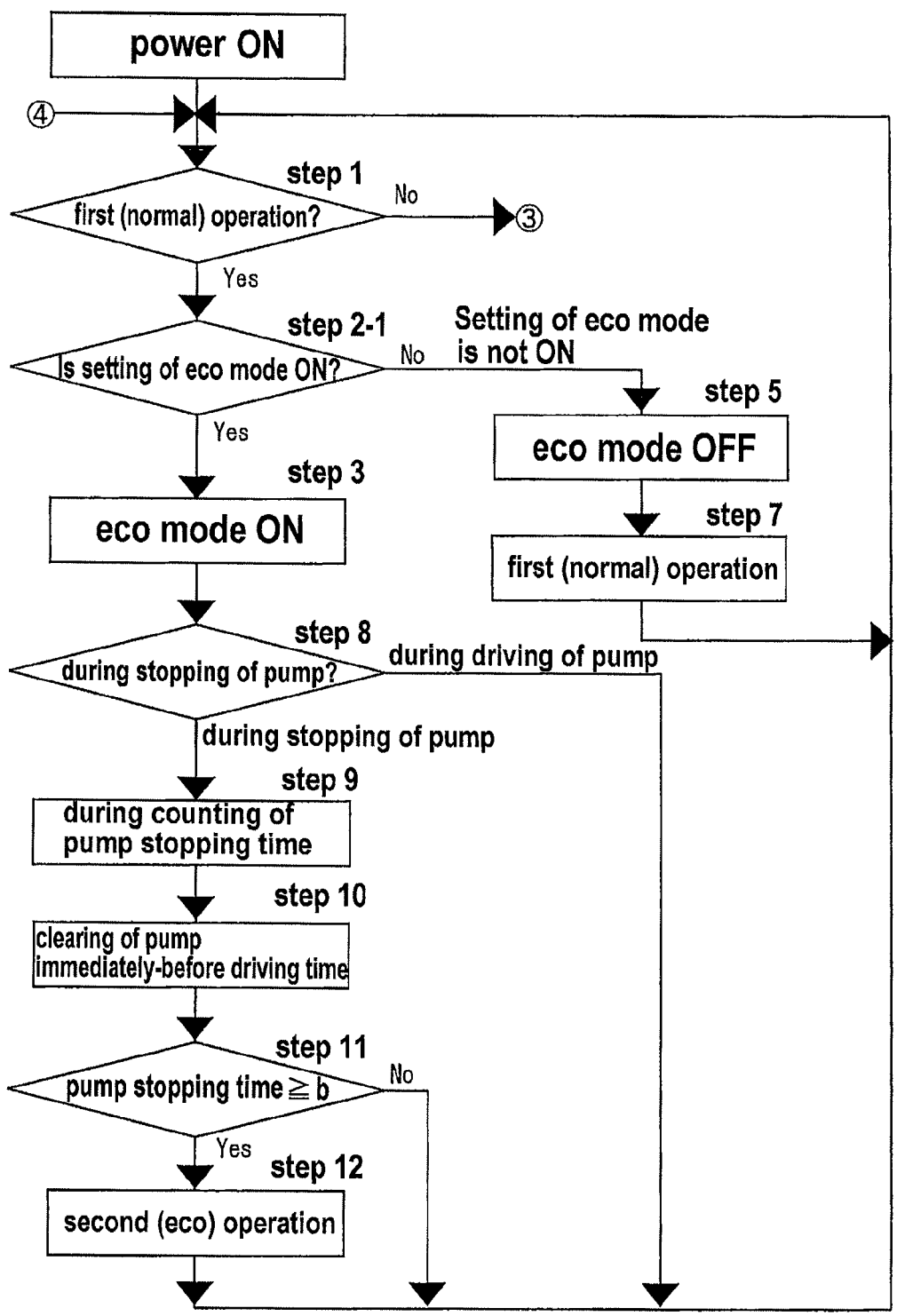
FIG. 14 is a flow chart when an operation of a pump of a water supply apparatus having no operation button for setting the eco mode is shifted from the first operation (normal operation) of the standard mode to the second operation (eco operation) of the eco mode.

FIG. 14 is a flow chart when the operation of the pump is shifted from the first operation (normal operation) of the standard mode in which the standard control head curve B shown in FIG. 5 is used, to the second operation (eco operation) in which the energy-saving control head curve $C_1$ is used in the case where the eco mode is set in advance. Points different from those in the flow chart shown in FIG. 12 are as follows.

Specifically, when it is judged that the operation of the pump is the first operation (normal operation) (step 1), it is judged whether the setting of the eco mode is ON (step 2-1), and when the setting of the eco mode is ON, the eco mode is turned ON (step 3), and then the operation of the pump is shifted to the step 8. In the case where the setting of the eco mode is not ON, the eco mode is turned OFF (step 5), and then the operation of the pump is returned to the step 1 while keeping the operation of the pump at the first operation (normal operation) (step 7).

Figure 15:
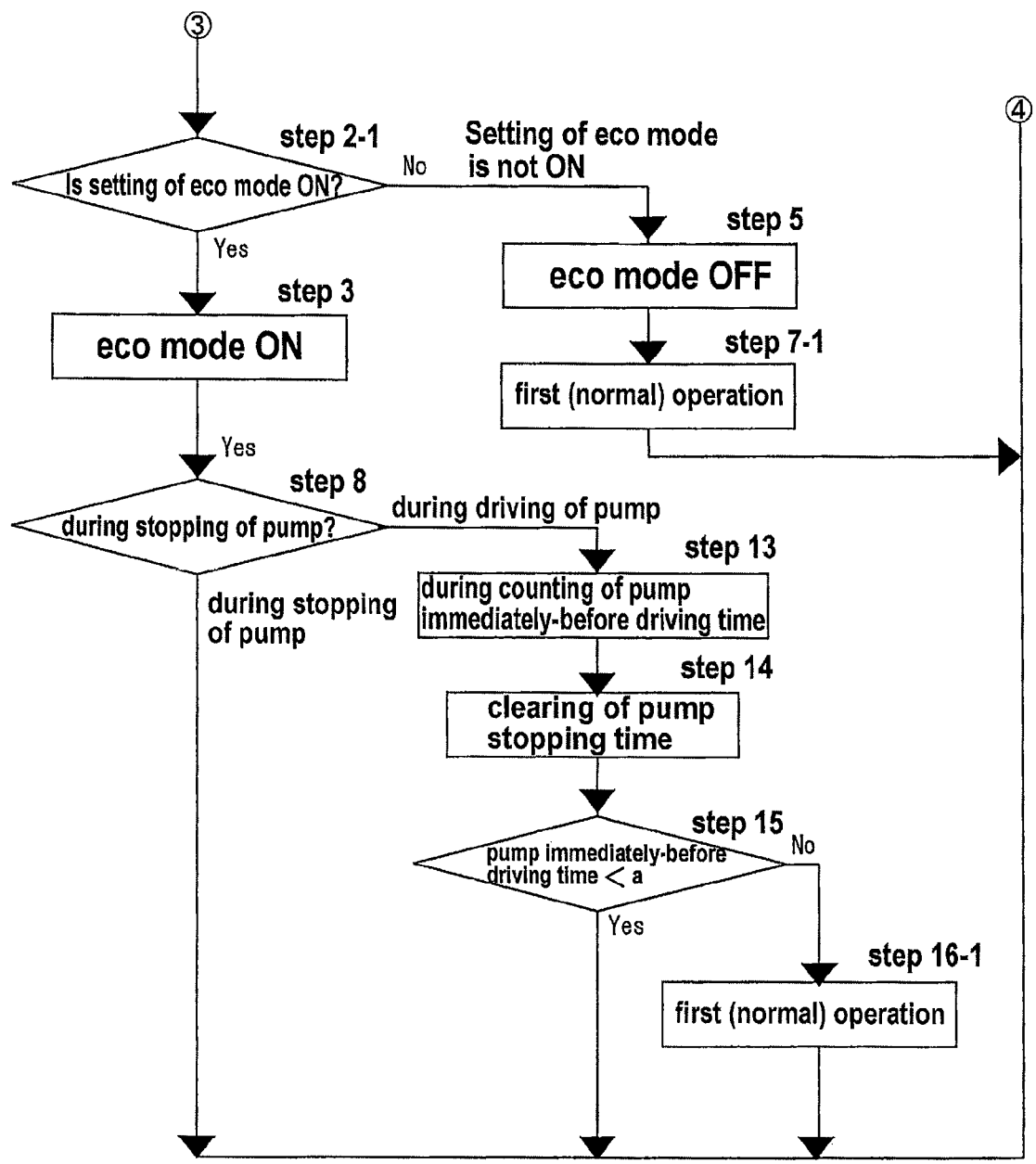
FIG. 15 is a flow chart when the operation of the pump of the water supply apparatus having no operation button for setting the eco mode is shifted from the second operation (eco operation) of the eco mode to the first operation (normal operation) of the standard mode.

FIG. 15 shows a flow chart when the operation of the pump is shifted from the second operation (eco operation) to the first operation (normal operation) in which the standard control head curve B is used in the case where it is judged that the pump is in the second operation (eco operation) (the pump is not in the first operation (normal operation)) in which the energy-saving control head curve $C_1$ shown in FIG. 5 is used in the step 1 in FIG. 14. Points different from those in the flow chart shown in FIG. 14 are as follows.

Specifically, when it is judged that the operation of the pump is the second operation (eco operation) (the operation of the pump is not the first operation (normal operation)) (step 1 in FIG. 14), it is judged whether the setting of the eco mode is ON (step 24). In the case where the setting of the eco mode is ON, the eco mode is turned ON (step 3), and then the operation of the pump is shifted to the step 8. In the case where the setting of the eco mode is not ON, the eco mode is turned OFF (step 5) and the operation of the pump is shifted from the second operation (eco operation) to the first operation (normal operation) (step 7-1), and then the operation of the pump is returned to the step 1.

In the case where the control head curves are switched, it is preferred that the control head curve is not changed in the maximum flow rate range so as not to change a product specification. Further, the water supply apparatus designed for ordinary households is often used to supply a small amount of water except for in the morning and evening when a large amount of water is used. Therefore, as shown by a curved line F in FIG. 10, the control head curve is made to be the energy-saving control head curve only in the small flow rate range in which the frequency of use is high. Therefore, it is possible to enhance energy-saving effect while ensuring the product specification at the maximum flow rate.

In the above examples, it has been exemplified to switch the control head curves in the estimated terminal pressure constant control as a switching means between the first operation (normal operation) and the second operation (eco operation). However, the switching means between the first operation (normal operation) and the second operation (eco operation) is not limited to the above examples. For example, in the case of the discharge pressure constant control, as shown in FIG. 5, an operation in which the standard control head curve (straight line) where a setting discharge pressure becomes a constant value $PA_1$ regardless of the usage flow rate is used to control the pump may become the first operation (normal operation). An operation in which the energy-saving head curve (straight line) where a setting discharge pressure becomes a discharge pressure $PA_2$ obtained by multiplying a constant ratio of less than "1" by the $PA_1$ is used to control the pump may become the second operation (eco operation). Further, the operation of the pump may become the second operation (eco operation) in which the pump is operated at a low rotational speed obtained by multiplying a constant ratio (for example "0.95") by the rotational speed of the pump.

Further, in the above example, the switching between the first operation (normal operation) and the second operation (eco operation) of the pump is judged by the pump immediately-before driving time or the pump stopping time. However, the judgement of the switching is not limited only to the operational state (operating history) like such time. The switching may be judged based on the pump immediately-before driving time and one or more of the operational state (operating history) including the rotational speed of the pump, the discharge pressure, the maximum flow rate, an average discharge flow rate at the pump immediately-before driving time and an integrated discharge flow rate at the pump immediately-before driving time. In other words, the switching may be judged based on judgement indexes which take into account not only the pump immediately-before driving time but also the amount of used water.

In the example, the pressure tank is used in the water supply apparatus. However, the energy-saving control which uses the above judgement indexes may be applied to a water supply apparatus in which a pressure tank is not used or a water supply apparatus which uses a single pump, for example, a line pump or the like as an apparatus for repeating the operating and the stopping of the pump.

Examples where arbitrary coefficients corresponding to the amount of used water are integrated and it is judged optimally by using the integrated results whether the second operation (eco operation) is performed will be described below.

If the switching from the first operation (normal operation) to second operation (eco operation) of the pump is judged only by the pump stopping time, the operation of the pump is switched to the second operation (eco operation) only during the stopping of the pump. Specifically, if the pump driving time is a long time even when the amount of used water is small, the first operation (normal operation) is continued. However, if the switching between the first operation and the second operation is judged based on the judgement indexes which take into account the amount of used water, it is possible to switch the operation of the pump from the first operation (normal operation) to the second operation (eco operation) when it is judged that the amount of used water is small even during the driving of the pump. In other words, when the amount of used water is small, the pump can be driven in the switched second operation (eco operation) even if the pump is driving. Thus, it is possible to reduce the power consumption more.

The amount of used water during the driving of the pump is proportional to the operating frequency of the pump, and thus an integrated coefficient "$\alpha$" corresponding to the operating frequency of the pump is defined. A flow rate as a reference on each site where the water supply apparatus is installed (for example, in collective housing such as an apartment building, the amount of used water in the daytime, not including the peak time zone in the morning and evening and the midnight time zone when water is rarely used) and its approximated flow rate are taken as a standard flow rate, and the integrated coefficient "$\alpha$" is defined as "0" ($\alpha=0$) at the standard flow rate. When the flow rate is lower than the standard flow rate, the integrated coefficient "$\alpha$" is defined as minus quantity ($\alpha<0$), and when the flow rate is higher than the standard flow rate, the integrated coefficient "$\alpha$" is defined as positive quantity ($\alpha>0$). For example, in the graph showing an example of the relationship between time and an amount of supplied water shown in FIG. 11, the arbitrary amount of supplied water in the range indicated by the dotted lines in FIG. 11, i.e., the arbitrary amount of supplied water in the range of about 25 L/min to about 35 L/min may be defined as the standard flow rate.

Figure 16:
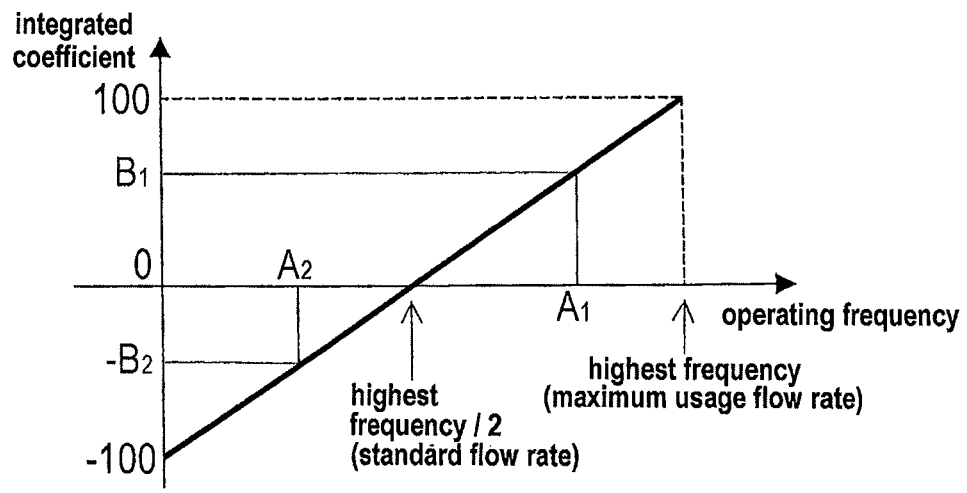
FIG. 16 is a graph showing the relationship between an operating frequency of the pump and an integrated coefficient.

As shown in FIG. 16, the flow rate when the operating frequency of the pump is, for example, one-half of the highest frequency is defined as a standard flow rate, and the integrated coefficient "$\alpha$" is defined as "0" ($\alpha=0$) at the standard flow rate and the integrated coefficient "$\alpha$" when the operating frequency of the pump is the highest frequency is defined as "100" ($\alpha=100$). Then, on the basis of a straight line where the integrated coefficient "$\alpha$" when the operating frequency of the pump is "0" is defined as "−100" ($\alpha=-100$), the integrated coefficient "$\alpha$" is calculated. In this case, for example, when the pump is driven at the operating frequency $A_1$, the integrated coefficient "$\alpha$" becomes $B_1$ ($\alpha=B_1$), and when the pump is driven at the operating frequency $A_2$, the integrated coefficient "$\alpha$" becomes $-B_2$ ($\alpha=-B_2$).

Figure 17:
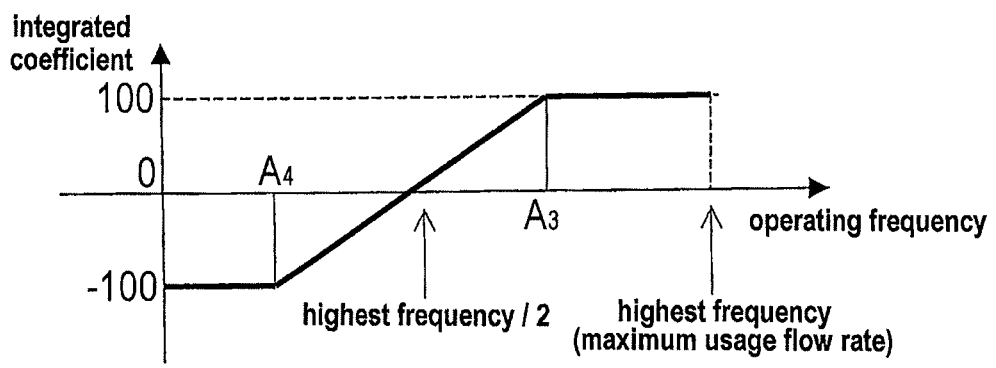
FIG. 17 is a graph showing another relationship between the operating frequency of the pump and the integrated coefficient.

As shown in FIG. 17, a graph is as follows: The flow rate when the operating frequency of the pump is, for example, one-half of the highest frequency is defined as a standard flow rate, and the integrated coefficient "$\alpha$" is defined as "0" ($\alpha=0$) at the standard flow rate and the integrated coefficient "$\alpha$" when the operating frequency of the pump is higher than a predetermined operating frequency $A_3$ is defined as "100" of a constant value ($\alpha=100$). Then, the integrated coefficient "$\alpha$" when the operating frequency of the pump is not more than a predetermined operating frequency $A_4$ is defined as "−100" of a constant value ($\alpha=-100$). The integrated coefficient may be calculated based on the graph shown in FIG. 17.

Figure 18:
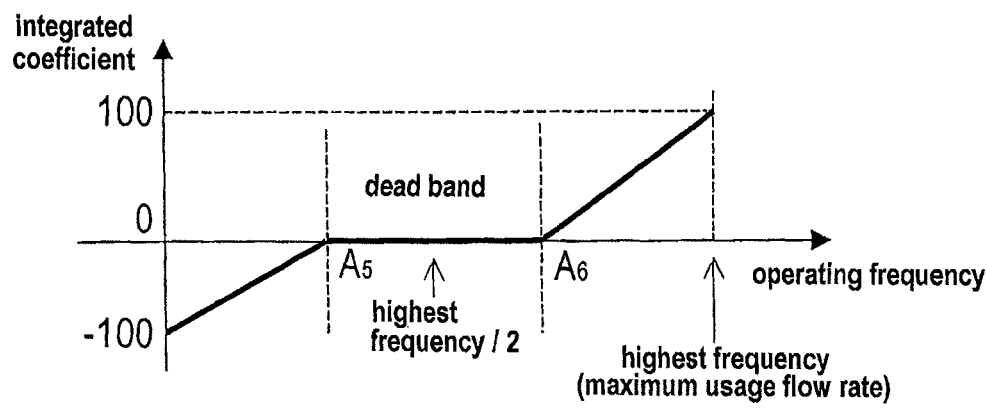
FIG. 18 is a graph showing still another relationship between the operating frequency of the pump and the integrated coefficient.

Further, as shown in FIG. 18, a graph is as follows: The flow rate when the operating frequency of the pump is, for example, one-half of the highest frequency is defined as a standard flow rate, and a predetermined operating frequency range $A_5-A_6$ across the standard flow rate is defined as a dead band range. Further, the integrated coefficient "$\alpha$" is defined as "0" ($\alpha=0$) when the pump is driven at the dead band range and the integrated coefficient "$\alpha$" is increased linearly to "100" when the pump is driven at the operating frequency more than that in the dead band range. Further, the integrated coefficient "$\alpha$" is decreased linearly to "−100" when the pump is driven by the operating frequency less than that in the dead band range. The integrated coefficient "$\alpha$" may be calculated based on the graph shown in FIG. 18.

If the dead band range exists, the integrated value does not fluctuate at the standard flow rate or thereabout. Therefore, in the time zone when the pump is driven at the standard flow rate or thereabout, the switching from the first operation (normal operation) to the second operation (eco operation) or the switching from the second operation (eco operation) to the first operation (normal operation) is not performed. Therefore, hunting can be reduced at the switching between the first operation (normal operation) and the second operation (eco operation) of the pump, and the switching between the first operation (normal operation) and the second operation (eco operation) can be judged with a more focus on the amount of used water of the user. Further, errors in the pressure sensor or the influence of noise and the like at the standard flow rate or thereabout can be reduced.

Figure 19:
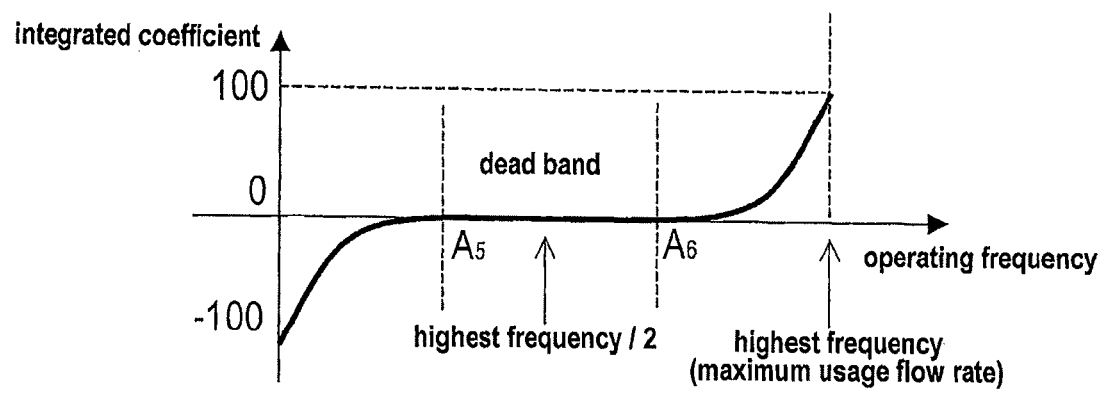
FIG. 19 is a graph showing yet another relationship between the operating frequency of the pump and the integrated coefficient.

As shown in FIG. 19, a graph is as follows: When the pump is driven at the operating frequency in excess of that in the dead band range, the integrated coefficient "$\alpha$" is increased to "100" along a quadratic curve as the operating frequency increases. When the pump is driven at the operating frequency less than that in the dead band range, the integrated coefficient "$\alpha$" is decreased to "−100" along a quadratic curve as the operating frequency decreases. The integrated coefficient "$\alpha$" may be calculated based on the graph shown in FIG. 19.

If the integrated coefficient "$\alpha$" is on the quadratic curve, increase and decrease of the integrated value with respect to a change of the amount of used water become larger than that in the integrated coefficient "$\alpha$" defined by the straight line in a large flow rate range or a small flow rate range. Therefore, in the large flow rate range or the small flow rate range, the switching between the first operation (normal operation) and the second operation (eco operation) of the pump can be performed at an early timing.

The integrated coefficient "α" is not limited to the numerical range that is "−100<α<100", but may be an arbitrary numerical range. However, if the switching from the first operation (normal operation) to the second operation (eco operation) is required to be performed during the operation of the pump, the integrated coefficient "α" should be "integrated coefficient "α"<0" when the amount of used water is small. In the above example, although the integrated coefficient is determined based on the operating frequency of the pump, the integrated coefficient may be determined based on the current value supplied to the motor instead of the operating frequency. In the case of the estimated terminal pressure constant control, the integrated coefficient may be determined based on the target pressure instead of the operating frequency.

The target pressure in the estimated terminal pressure constant control is calculated on the basis of the fact that the frequency of the pump during the operation of the pump is proportional to the amount of used water. Therefore, if the target pressure in the estimated terminal pressure constant control is used instead of the operating frequency, there is no need to calculate the flow rate of all the pumps which are driven, particularly in the case of operating the plural pumps.

Thereafter, the calculated integrated coefficients are integrated at arbitrary sampling intervals to obtain integrated values. At this time, if the driving time of the pump is long, the integrated value becomes too small or too large, and there is a possibility that the pressure control is delayed when the flow rate of water fluctuates rapidly. Therefore, upper and lower limits may be set on the integrated value. When the operation of the pump is continued over a long time, the integrated value may be cleared at regular time intervals, for example, once an hour.

Figure 20:
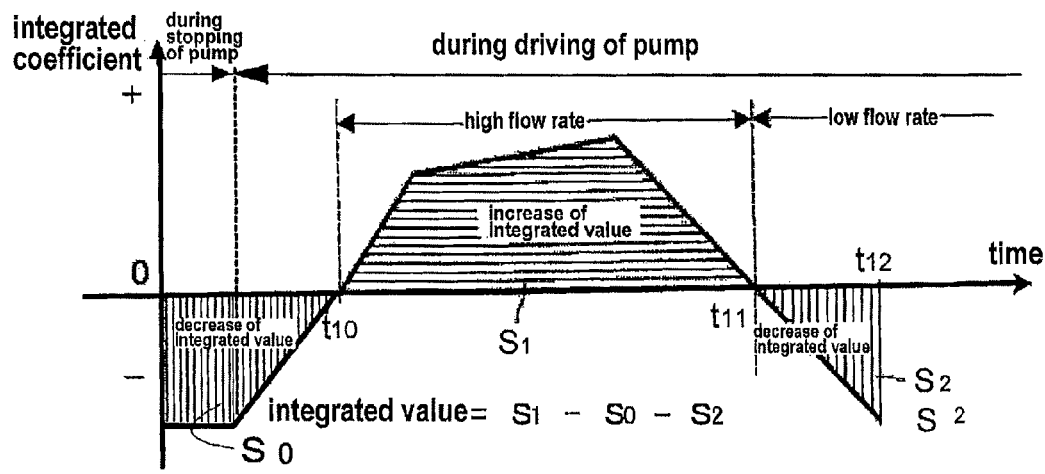
FIG. 20 is a graph showing an example of an integrated value of the integrated coefficient when the integrated coefficient is calculated based on the graph shown in FIG. 17 and time.

FIG. 20 shows an example of the relationship between the integrated value of the integrated coefficient when the integrated coefficient is calculated based on the graph shown in FIG. 17 and time. In this example, the integrated value of the integrated coefficient is shown as follows: The pump starts to be driven, and then the pump is in an operation where the integrated coefficient "α" becomes positive quantity (α>0) from the time $t_{10}$ to the time $t_{11}$, i.e., the pump is driven at the operating frequency exceeding one-half of the highest frequency. Thereafter, the pump is in an operation where the integrated coefficient "α" becomes minus quantity (α<0), i.e., the pump is driven at the operating frequency less than one-half of the highest frequency, and then the present time $t_{12}$ is reached.

Specifically, the integrated value becomes positive quantity because the integrated coefficient "α" is positive quantity from the time $t_{10}$ to the time $t_{11}$. The integrated value becomes minus quantity because the integrated coefficient is minus quantity from the time 0 to the time $t_{10}$ and from the time $t_{11}$ to the time $t_{12}$. Therefore, a value $(S_1-(S_0+S_2))$ obtained by subtracting an area $S_0$ which represents an area of the integrated value of the integrated coefficient from the time 0 to the time $t_{10}$ and an area $S_2$ which represents an area of the integrated value of the integrated coefficient from the time $t_{11}$ to the time $t_{12}$ from an area $S_1$ which represents the integrated value of the integrated coefficient from the time $t_{10}$ to the time $t_{11}$ becomes the integrated value of the integrated coefficient at the present time $t_{12}$.

Further, for example, a threshold to be compared with the integrated value of the integrated coefficient when the first operation (normal operation) is shifted to the second operation (eco operation) is defined as a first threshold. A threshold to be compared with the integrated value of the integrated coefficient when the second operation (eco operation) is shifted to the first operation (normal operation) is defined as a second threshold. For example, the first threshold and the second threshold are defined as the following formula 3 using the n-th threshold (n=1 or 2), and the relationship between the first threshold and the second threshold is set as the following formula 4.

The $n$-th threshold=$m_n \times \alpha_{max} \times N \times T_n$ \hfill (formula 3)

The first threshold≤the second threshold \hfill (formula 4)

Here, the above symbols are as follows: $m_n$:arbitrary coefficient, $\alpha_{max}$:integrated coefficient at the maximum amount of used water, N:the number of samplings per second, and $T_n$:arbitrary time (unit:second).

In the case where the first operation (normal operation) is shifted to the second operation (eco operation) when the integrated value of the integrated coefficient becomes 0 (zero), the n-th threshold represented by the formula 3 may be the first threshold, and a coefficient $m_1$ or time $T_1$ may be zero (0), and then the first threshold may be zero (0). In the case where the second operation (eco operation) is shifted to the first operation (normal operation) when the number of samplings per second is 10 times and the flow rate which is two times the integrated coefficient at the maximum amount of used water is used for three seconds, the second threshold is determined by substituting $m_2$=2, $\alpha_{max}$=100, N=10, and $T_2$=3 into the formula. The first threshold may be equal to the second threshold.

Figure 21:
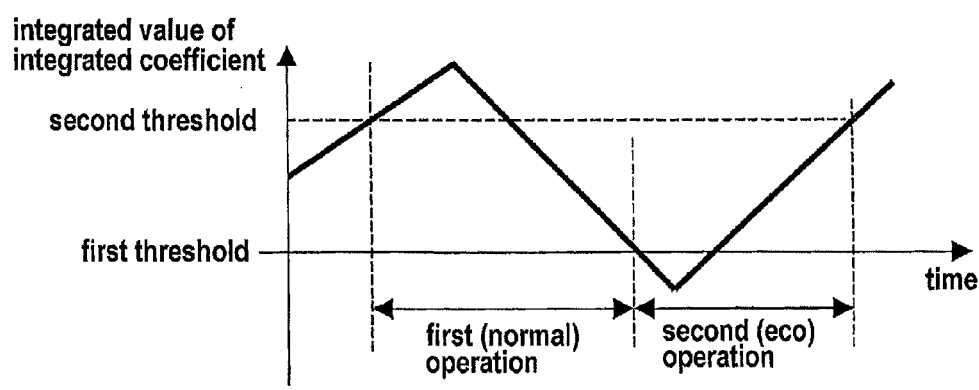
FIG. 21 is a graph showing the relationship between a first threshold and a second threshold, and the first operation (normal operation) and the second operation (eco operation)

As shown in FIG. 21, the operation of the pump is shifted from the first operation (normal operation) to the second operation (eco operation) when the integrated value of the integrated coefficient is less than the first threshold during the first operation (normal operation) of the pump. On the other hand, the operation of the pump is shifted from the second operation (eco operation) to the first operation (normal operation) when the integrated value of the integrated coefficient exceeds the second threshold during the second operation (eco operation) of the pump.

Figure 22:
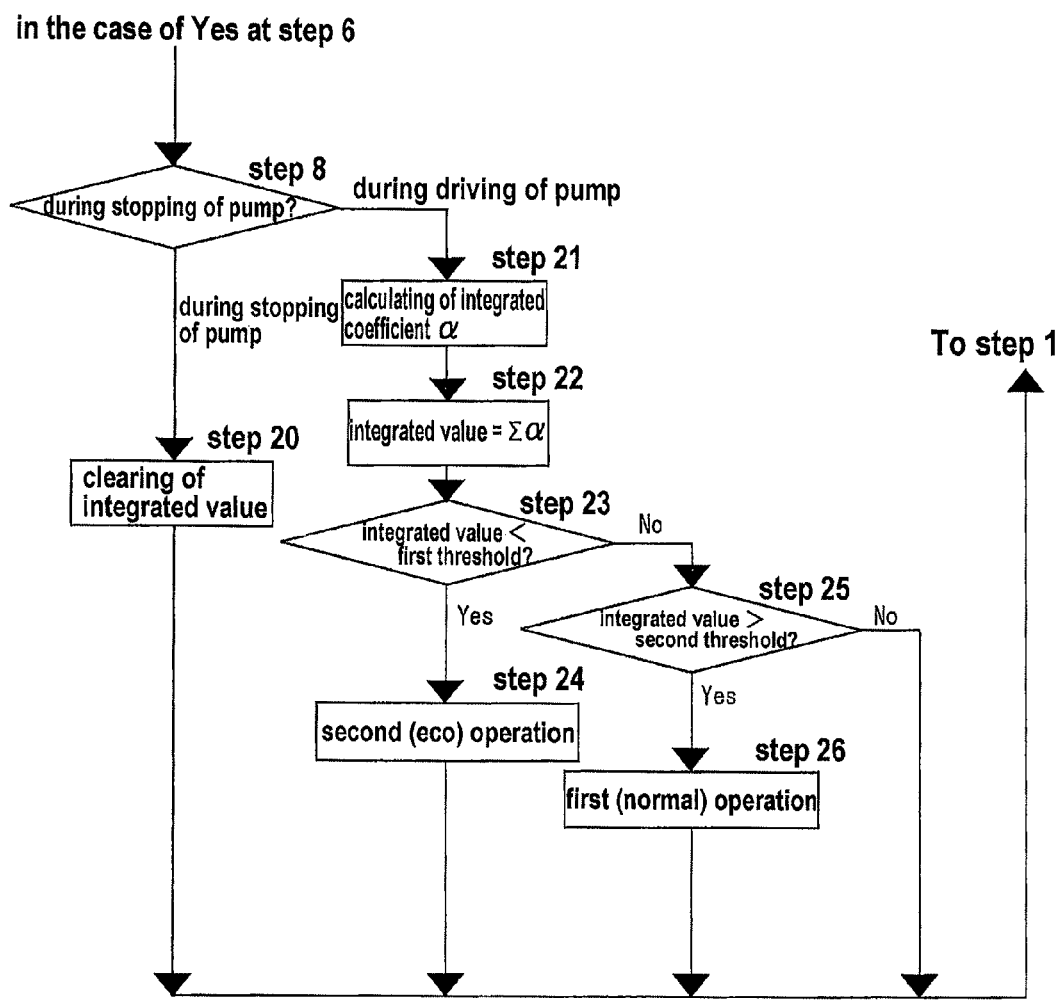
FIG. 22 is a main part of a flow chart for performing switch between the first operation (normal operation) and the second operation (eco operation) by comparing the integrated value of the integrated coefficient with the first threshold and the second threshold.

FIG. 22 shows a main part (step 8 and the subsequent steps in FIG. 12 and FIG. 13) of the flow chart at the operation of the pump shown in FIG. 21. Specifically, it is judged whether the pump is stopping (step 8), and if the pump is stopping, the integrated value is cleared (step 20), and then the operation of the pump is returned to the step 1 (see FIG. 12 and FIG. 13).

In the case where the pump is operated at the first operation (normal operation), the integrated coefficient "α" is calculated (step 21), and then the integrated value of the integrated coefficient "α" is determined (step 22). Thereafter, the integrated value of the integrated coefficient is compared with the first threshold (step 23), and when the integrated value of the integrated coefficient is smaller than the first threshold (the integrated value of the integrated coefficient<the first threshold (=0)), the first operation (normal operation) is shifted to the second operation (eco operation) (step 24), and then the operation of the pump is returned to the step 1. In the case where the integrated value of the integrated coefficient is not less than the first threshold (the integrated of the integrated coefficient the first threshold (=0)), the integrated value of the integrated coefficient is compared with the second threshold (step 25). If the integrated value is larger than the second threshold (the integrated value>the second threshold), the first operation (normal operation) is continued (step 26), and the operation of the pump is returned to the step 1. If the integrated value is not more than the second threshold (the integrated value≤the second threshold), the operation of the pump is returned to the step 1 while keeping the operation of the pump at the first operation (normal operation).

If the pump is driven at the second operation (eco operation), the integrated coefficient "α" is calculated (step 21), and then the integrated value of the integrated coefficient is determined (step 22). Thereafter, the integrated value of the integrated coefficient is compared with the first threshold (step 23), and if the integrated value of the integrated coefficient is smaller than the first threshold (the integrated value of the integrated coefficient<the first threshold (=0)), the second operation (eco operation) is continued (step 24), and the operation of the pump is returned to the step 1. If the integrated value of the integrated coefficient is not less than the first threshold (the integrated value of the integrated coefficient≥the first threshold (=0)), the integrated value of the integrated coefficient is compared with the second threshold (step 25), and if the integrated value of the integrated coefficient is larger than the second threshold (integrated value of the integrated coefficient>the second threshold), the operation of the pump is shifted from the second operation (eco operation) to the first operation (normal operation) (step 26), and the operation of the pump is returned to the step 1. If the integrated value is not more than the second threshold (the integrated value≤the second threshold), the second operation (eco operation) is continued, and the operation of the pump is returned to the step 1.

In the above embodiment, the case where the integrated coefficients "α" as arbitrary coefficient corresponding to the amount of used water during the driving of the pump are integrated, and the optimal judgement whether the second operation (eco operation) is performed by using the integrated results has been described. However, the energy-saving control head curve for performing the second operation (eco operation) may be modified (updated) based on the integrated results (integrated values) obtained by integrating the integrated coefficients "α", and the eco operation may be performed.

Figure 23:
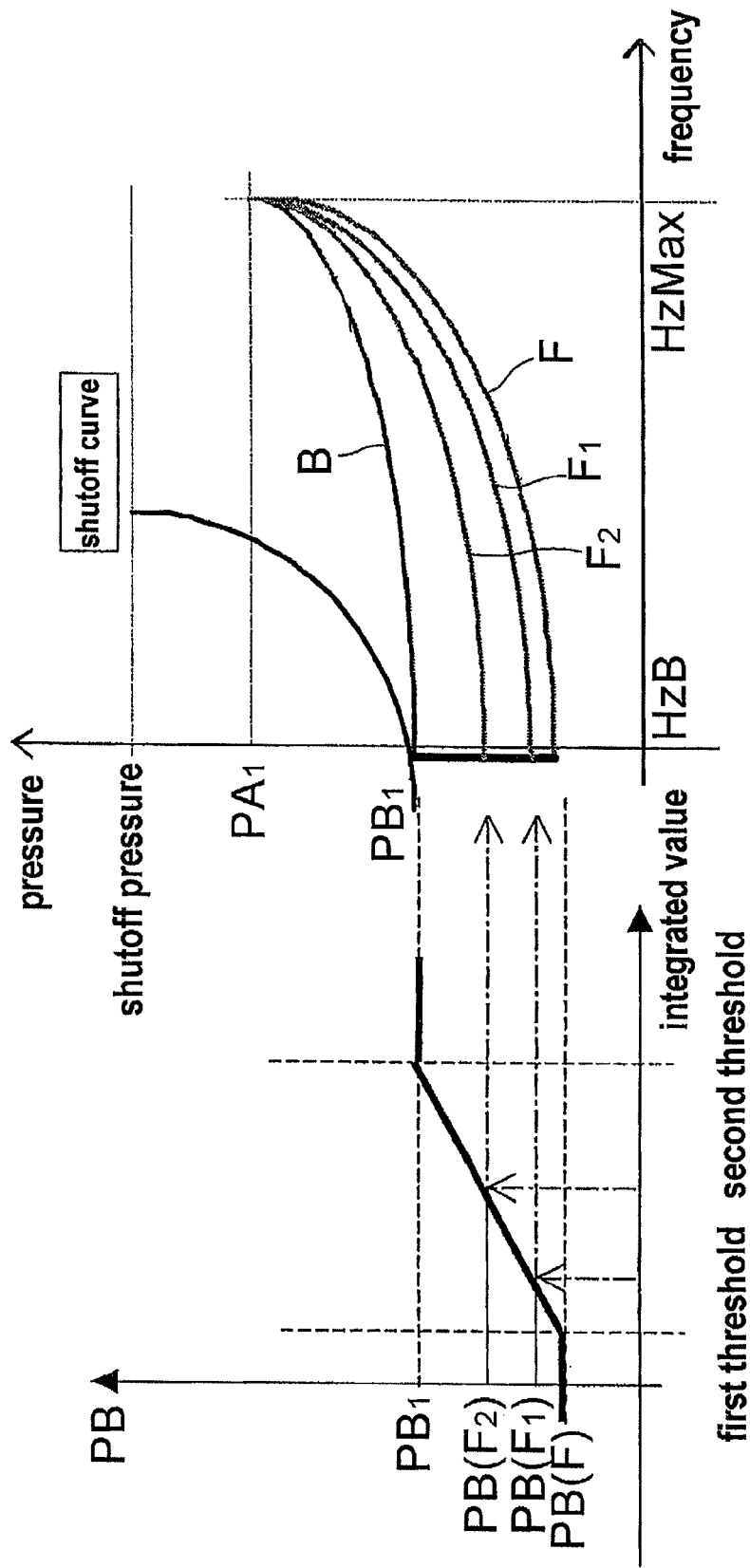
FIG. 23 is a view used for explaining an example in which the energy-saving control head curve is updated to a new energy-saving control head curve which is proportional to the integrated value of the integrated coefficient.

For example, as shown in FIG. 10, in the case of the estimated terminal pressure constant control in which the energy-saving control head curve F is used, as shown in FIG. 23, the energy-saving control head curve F may be updated to a new energy-saving control head curve $F_1$ or $F_2$ which is proportional to the integrated value of the integrated coefficient.

The lowest required pressure PB ($F_1$) or PB ($F_2$) of the energy-saving control head curve $F_1$ or $F_2$ is determined from an intersection between a straight line where the lowest required pressure PB (F) of the energy-saving control head curve F corresponds to the first threshold and the lowest required pressure $PB_1$ of the standard control head curve B corresponds to the second threshold and the integrated value of the integrated coefficient.

Figure 24:
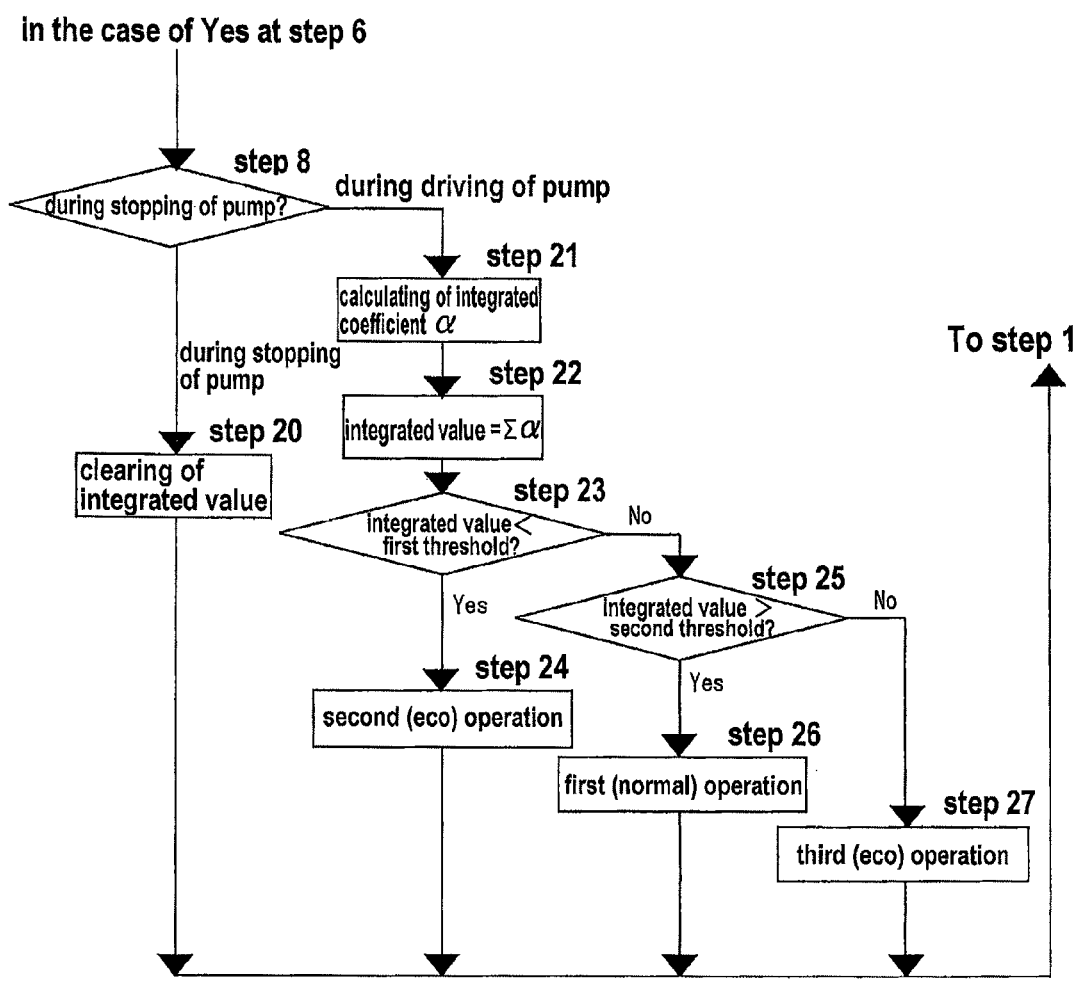
FIG. 24 is a main part of a flow chart when the energy-saving control head curve is shifted to the new updated energy-saving control head curve.

In this case, as shown in FIG. 24, even if the pump is driven at the first operation (normal operation), when the integrated value of the integrated coefficient is not less than the first threshold (the integrated value of the integrated coefficient≥the first threshold (=0)) and the integrated value of the integrated coefficient is not more than the second threshold (the integrated value of the integrated coefficient-≤the second threshold), the pump is operated as follows: The operation of the pump is shifted from the first operation (normal operation) to the third operation (eco operation) (step 27) based on the energy-saving control head curve $F_1$ or $F_2$, and the operation of the pump is returned to the step 1.

Further, in the case where the pump is driven at the second operation (eco operation), and the integrated value of the integrated coefficient is not less than the first threshold (the integrated value of the integrated coefficient the first threshold (=0)) and the integrated value of the integrated coefficient is not more than the second threshold (the integrated value of the integrated coefficient the second threshold), the pump is operated as follows: The operation of the pump is shifted from the second operation (eco operation) based on the energy-saving control head curve F to the third operation (eco operation) (step 27) based on the energy-saving control head curve $F_1$ or $F_2$, and the operation of the pump is returned to the step 1. In this example, the case where the two integrated values of the integrated coefficients exist between the first threshold and the second threshold and the operation of the pump is shifted to the third operation (eco operation) based on the energy-saving control head curve $F_1$ or $F_2$ has been described. However, the operation of the pump may be shifted to the third operation stepwise based on only one energy-saving control head curve or three or more energy-saving control head curves. Further, the lowest required pressure PB ($F_x$) of the energy-saving control head curve is continuously modified (updated) based on the integrated value of the integrated coefficient at all times, and the continuously updated energy-saving control head curve may be applied to the eco operation. The same shall apply in the following example shown in FIG. 25.

Further, for example, as shown in FIG. 5, in the case of the discharge pressure constant control in which the energy-saving control head curve G is used, when the integrated value of the integrated coefficient exists between the first threshold and the second threshold, as shown in FIG. 25, the energy-saving control head curve G may be updated to a new energy-saving control head curve $G_1$ or $G_2$ which is proportional to the integrated value of the integrated coefficient.

The highest required pressure PA ($G_1$) or PA ($G_2$) (usually target pressure setting pressure) of the energy-saving control head curve $G_1$ or $G_2$ is determined from an intersection between a straight line where the highest required pressure PA (G) of the energy-saving control head curve G corresponds to the first threshold and the highest required pressure $PA_1$ of the standard control head curve B corresponds to the second threshold, and the integrated value of the integrated coefficient. The control example in this case is the same as that in the above example shown in FIG. 24.

As described above, the control where the energy-saving control head curve is updated to a new energy-saving control head curve which is proportional to the integrated value of the integrated coefficient may be applied not only to the case where the switching between the standard control head curve and the energy-saving control head curve is automatically performed but also the case where an appropriate curve is automatically selected from a plurality of energy-saving control head curves, even if the switching is performed manually.

Although the embodiment of present invention has been described above, the present invention is not limited to the above embodiment, but may be reduced to practice in various different manners within the scope of the technical concept thereof.

INDUSTRIAL APPLICABILITY

The present invention is applicable to a water supply apparatus for supplying water and a water supply method for supplying water such as tap water to collective housing or a building using a pump.

REFERENCE SIGNS LIST 1 pump
2 inverter (frequency converter)
3 pressure tank
4 discharge-side pressure sensor
8 suction-side pipe
9 water main
10 suction-side pressure sensor
12 bypass pipe
13 discharge-side pipe controller
16 setting unit
17 memory
18 processor
19 display unit
20 I/O unit
21 operation panel
22 selector button
23 energy-saving indicator
A required head curve
B (standard) control head curve
C, D, E, F, G energy-saving control head curve

The invention claimed is:

1. A water supply apparatus comprising:
a pump configured to pressurize and deliver water;
a frequency converter configured to supply electric power to the pump to operate the pump at a variable speed; and
a controller configured to send operating signals to the frequency converter so as to operate the pump either at a first operation or at a second operation with less power consumption than the first operation;
wherein the controller is configured to judge whether the operation of the pump should be shifted from the first operation to the second operation based on an operational state of the pump; and
wherein the controller is configured to judge that the operation of the pump should be shifted from the first operation to the second operation in the case where a pump stopping time when the pump is not driven is longer than a predetermined time.

2. The water supply apparatus according to claim 1, wherein the controller is configured to judge that the operation of the pump should be shifted from the first operation to the second operation when an integrated value of an arbitrary coefficient corresponding to an amount of used water is smaller than a first threshold which is set based on a pump driving time when the pump is driven at the first operation, a pump stopping time, and an amount of used water.

3. A water supply apparatus comprising:
a pump configured to pressurize and deliver water;
a frequency converter configured to supply electric power to the pump to operate the pump at a variable speed; and
a controller configured to send operating signals to the frequency converter so as to operate the pump either at a first operation or at a second operation with less power consumption than the first operation;
wherein the controller is configured to judge whether the operation of the pump should be shifted from the second operation to the first operation based on an operational state of the pump; and
wherein the controller is configured to judge that the operation of the pump should be shifted from the second operation to the first operation in the case where a pump immediately-before driving time is longer than a predetermined time when the pump is continuously driven at the second operation.

4. The water supply apparatus according to claim 3, wherein the controller is configured to judge that the operation of the pump should be shifted from the second operation to the first operation when an integrated value of an arbitrary coefficient corresponding to an amount of used water exceeds a second threshold which is set based on a pump driving time when the pump is driven at the second operation, a pump stopping time, and an amount of used water.

5. A water supply apparatus comprising:
a pump configured to pressurize and deliver water;
a frequency converter configured to supply electric power to the pump to operate the pump at a variable speed; and
a controller configured to send operating signals to the frequency converter so as to operate the pump either at a first operation or at a second operation with less power consumption than the first operation;
wherein the controller is configured to judge whether the operation of the pump should be shifted from the first operation to the second operation and from the second operation to the first operation based on an operational state of the pump;
wherein the controller is configured to judge that the operation of the pump should be shifted from the first operation to the second operation in the case where a pump stopping time is longer than a predetermined time when the pump is not driven; and
wherein the controller is configured to judge that the operation of the pump should be shifted from the second operation to the first operation in the case where a pump immediately-before driving time is longer than a predetermined time when the pump is continuously driven at the second operation.

6. The water supply apparatus according to claim 5, wherein the controller is configured to judge that the operation of the pump should be shifted from the first operation to the second operation when an integrated value of an arbitrary coefficient corresponding to an amount of used water is smaller than a first threshold which is set based on a pump driving time when the pump is driven at the first operation, a pump stopping time, and an amount of used water; and
wherein the controller is configured to judge that the operation of the pump should be shifted from the second operation to the first operation when the integrated value exceeds a second threshold which is set based on a pump driving time when the pump is driven at the second operation, a pump stopping time, and an amount of used water.

7. The water supply apparatus according to claim 6, wherein the first operation of the pump is an operation which is controlled along a first head curve showing the relationship between a flow rate and a pump head of the pump; and
wherein the second operation of the pump is an operation which is controlled along a second head curve showing the relationship between a flow rate and a pump head of the pump.

8. The water supply apparatus according to claim 7, wherein the first head curve and the second head curve are stored in a memory of the controller;
- wherein the first head curve is a standard control head curve; and
- wherein the second head curve is an energy-saving control head curve that extends substantially parallel to the first head curve and has a head lower than that of the first head curve over the full flow rate range, or an energy-saving control head curve that has a head lower than that of the first head curve in a medium flow rate range, or an energy-saving control head curve that has a head lower than that of the first head curve in a large flow rate range, or an energy-saving control head curve that has a head lower than that of the first head curve in a small flow rate range.

9. A water supply method comprising:
- pressurizing and delivering water by supplying electric power from a frequency converter to a pump to operate the pump at a first operation;
- judging whether the operation of the pump should be shifted from the first operation to a second operation with less power consumption than the first operation based on an operational state of the pump; and
- shifting the operation of the pump from the first operation to the second operation based on the judgment result;
- wherein the operation of the pump is shifted from the first operation to the second operation in the case where a pump stopping time when the pump is not driven is longer than a predetermined time.

10. The water supply method according to claim 9, wherein the operation of the pump is shifted from the first operation to the second operation when an integrated value of an arbitrary coefficient corresponding to an amount of used water is smaller than a first threshold which is set based on a pump driving time when the pump is driven at the first operation, a pump stopping time, and an amount of used water.

11. A water supply method comprising:
- pressurizing and delivering water by supplying electric power from a frequency converter to a pump to operate the pump at a second operation with less power consumption than a first operation;
- judging whether the operation of the pump should be shifted from the second operation to the first operation based on an operational state of the pump; and
- shifting the operation of the pump from the second operation to the first operation based on the judgment result;
- wherein the operation of the pump is shifted from the second operation to the first operation in the case where a pump immediately-before driving time is longer than a predetermined time when the pump is continuously driven at the second operation.

12. The water supply method according to claim 11, wherein the operation of the pump is shifted from the second operation to the first operation when an integrated value of an arbitrary coefficient corresponding to an amount of used water exceeds a second threshold which is set based on a pump driving time when the pump is driven at the second operation, a pump stopping time, and an amount of used water.

13. A water supply method comprising:
- pressurizing and delivering water by supplying electric power from a frequency converter to a pump to operate the pump at a first operation;
- judging whether the operation of the pump should be shifted from the first operation to a second operation with less power consumption than the first operation based on an operational state of the pump and shifting the operation of the pump from the first operation to the second operation based on the judgment result; and
- judging whether the operation of the pump should be shifted from the second operation to the first operation based on the operational state of the pump and shifting the operation of the pump from the second operation to the first operation based on the judgment result;
- wherein the operation of the pump is shifted from the first operation to the second operation in the case where a pump stopping time is longer than a predetermined time when the pump is not driven; and
- wherein the operation of the pump is shifted from the second operation to the first operation in the case where a pump immediately-before driving time is longer than a predetermined time when the pump is continuously driven at the second operation.

14. The water supply method according to claim 13, wherein the operation of the pump is shifted from the first operation to the second operation when an integrated value of an arbitrary coefficient corresponding to an amount of used water is smaller than a first threshold which is set based on a pump driving time when the pump is driven at the first operation, a pump stopping time, and an amount of used water; and
- wherein the operation of the pump is shifted from the second operation to the first operation when the integrated value exceeds a second threshold which is set based on a pump driving time when the pump is driven at the second operation, a pump stopping time, and an amount of used water.

15. The water supply method according to claim 14, wherein the first operation of the pump is an operation which is controlled along a first head curve showing the relationship between a flow rate and a pump head of the pump; and
- wherein the second operation of the pump is an operation which is controlled along a second head curve showing the relationship between a flow rate and a pump head of the pump.

16. The water supply method according to claim 15, wherein the first head curve is a standard control head curve; and
- wherein the second head curve is an energy-saving control head curve that extends substantially parallel to the first head curve and has a head lower than that of the first head curve over the full flow rate range, or an energy-saving control head curve that has a head lower than that of the first head curve in a medium flow rate range, or an energy-saving control head curve that has a head lower than that of the first head curve in a large flow rate range, or an energy-saving control head curve that has a head lower than that of the first head curve in a small flow rate range.

17. A control program for controlling a water supply apparatus which comprises a pump configured to pressurize and deliver water and a frequency converter configured to supply electric power to the pump to operate the pump at a variable speed, the control program comprising:
- performing an arithmetic processing in which electric power is supplied from the frequency converter to the pump to operate the pump at a first operation, thereby pressurizing and delivering water;
- performing an arithmetic processing in which it is judged whether the operation of the pump should be shifted from the first operation to a second operation with less power consumption than the first operation based on an operational state of the pump, and the operation of the pump is shifted from the first operation to the second operation based on the judgment result, and then performing an arithmetic processing in which the pump is operated at the second operation to pressurize and deliver water; and performing an arithmetic processing in which it is judged whether the operation of the pump should be shifted from the second operation to the first operation based on the operational state of the pump, and the operation of the pump is shifted from the second operation to the first operation based on the judgment result, and then performing an arithmetic processing in which the pump is operated at the first operation to pressurize and deliver water;

wherein the operation of the pump is shifted from the first operation to the second operation in the case where a pump stopping time is longer than a predetermined time when the pump is not driven; and wherein the operation of the pump is shifted from the second operation to the first operation in the case where a pump immediately-before driving time is longer than a predetermined time when the pump is continuously driven at the second operation.

18. The control program according to claim 17, wherein the first operation of the pump is an operation which is controlled along a first head curve showing the relationship between a flow rate and a pump head of the pump;

wherein the second operation of the pump is an operation which is controlled along a second head curve showing the relationship between a flow rate and a pump head of the pump;

wherein the first head curve is a standard control head curve; and wherein the second head curve is an energy-saving control head curve that extends substantially parallel to the first head curve and has a head lower than that of the first head curve over the full flow rate range, or an energy-saving control head curve that has a head lower than that of the first head curve in a medium flow rate range, or an energy-saving control head curve that has a head lower than that of the first head curve in a large flow rate range, or an energy-saving control head curve that has a head lower than that of the first head curve in a small flow rate range.

19. A control device for controlling a water supply apparatus which comprises a pump configured to pressurize and deliver water and a frequency converter configured to supply electric power to the pump to operate the pump at a variable speed, the control device comprising:

a setting unit as a human interface;

a memory configured to store a control program according to claim 17 and to store data inputted from the setting unit;

an I/O unit configured to receive signals from sensors installed in the water supply apparatus and to send signals to a processor set forth below, and to send operating signals from the processor to the frequency converter so as to operate the pump either at a first operation or at a second operation with less power consumption than the first operation; and the processor configured to perform the control program based on data stored in the memory and signals sent from the I/O unit.

\* \* \* \* \*